US012512877B1

(12) United States Patent
Shalaby et al.

(10) Patent No.: US 12,512,877 B1
(45) Date of Patent: Dec. 30, 2025

(54) SYSTEM AND METHOD FOR MITIGATING RAIN-INDUCED CROSSTALK IN WIRELESS COMMUNICATIONS

(71) Applicant: IMAM MOHAMMAD IBN SAUD ISLAMIC UNIVERSITY, Riyadh (SA)

(72) Inventors: Mohamed Yehia Mohamed Shalaby, Riyadh (SA); Sulaiman S. Alsowayan, Riyadh (SA); Abdulrahman M. Shalaby, Kajang (MY)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/258,797

(22) Filed: Jul. 2, 2025

(51) Int. Cl.
*H04B 7/005* (2006.01)
*H01Q 21/24* (2006.01)
*H04B 7/0417* (2017.01)

(52) U.S. Cl.
CPC .............. *H04B 7/005* (2013.01); *H01Q 21/24* (2013.01); *H04B 7/0417* (2013.01)

(58) Field of Classification Search
CPC ........ H04B 7/005; H04B 7/02; H04B 7/0417; H04L 1/06; H01Q 21/24
(Continued)

(56) References Cited

U.S. PATENT DOCUMENTS 4,313,220 A  1/1982 Lo et al.
4,965,809 A  10/1990 Endo
(Continued)

FOREIGN PATENT DOCUMENTS

EP   7-15409 A    1/1995
EP   1 517 455 A1  3/2005

OTHER PUBLICATIONS

Nurul Najwa Md YUSOF, et al., "Enhancing millimeter-wave communication: a tropical perspective on raindrop size distribution and signal attenuation", International Journal of Electrical and Computer Engineering, vol. 15, Issue 1, Feb. 2025, pp. 467-479.
(Continued)

*Primary Examiner* — Young T. Tse
(74) *Attorney, Agent, or Firm* — Oblon, McClelland, Maier & Neustadt, L.L.P.

(57) ABSTRACT

A system and method for mitigating rain-induced crosstalk in a wireless communication between an unmanned aerial vehicle (UAV) and a ground-based receiver. The system includes a dual-polarized multiple-input multiple-output (MIMO) antenna array for transmitting signals on orthogonal polarization channels, along with a rain sensor and an altitude sensor mounted on the UAV. These sensors are connected to a processing unit to calculate phase shifts and attenuation for vertical and horizontal channels based on rainfall intensity and UAV height. The processing unit generates a pre-equalization parameter to compensate for differential effects between polarization channels. An equalization circuit, co-located with the processing unit and connected to the dual-polarized MIMO antenna array, receives the pre-equalization parameter and applies the pre-equalization parameter to an input signal before transmission. The equalization circuit adjusts a phase and an amplitude of each polarization channel to counteract the rain-induced crosstalk.

17 Claims, 14 Drawing Sheets

(58) Field of Classification Search
USPC .................. 375/259, 260, 267; 701/3, 415
See application file for complete search history.

(56) References Cited

U.S. PATENT DOCUMENTS

| | | | | |
|---|---|---|---|---|
| 2017/0257124 A1* | 9/2017 | Gan | ................... | H04B 1/082 |
| 2018/0156906 A1* | 6/2018 | Bennett | ................... | G01S 13/04 |
| 2018/0356560 A1* | 12/2018 | Averbuch | ................ | G01W 1/10 |
| 2023/0261374 A1* | 8/2023 | De Maaijer | .......... | H04B 1/0475 |
| 2025/0110025 A1* | 4/2025 | Ouyang | .............. | G01F 23/0023 |

OTHER PUBLICATIONS

Lu Li, et al., "Attenuation of mmWave Based on Measured Data via Rain Sensor in Tropical Region", 2022 IEEE 6th International Symposium on Telecommunication Technologies, Nov. 14-16, 2022, Abstract only, 1 page.

* cited by examiner

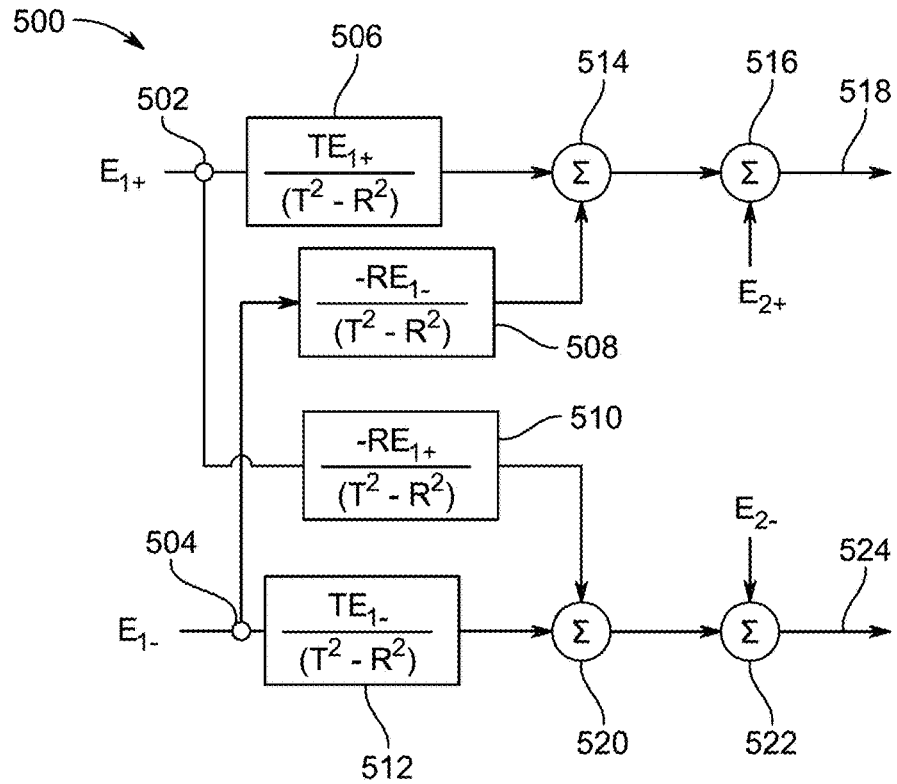
FIG. 5
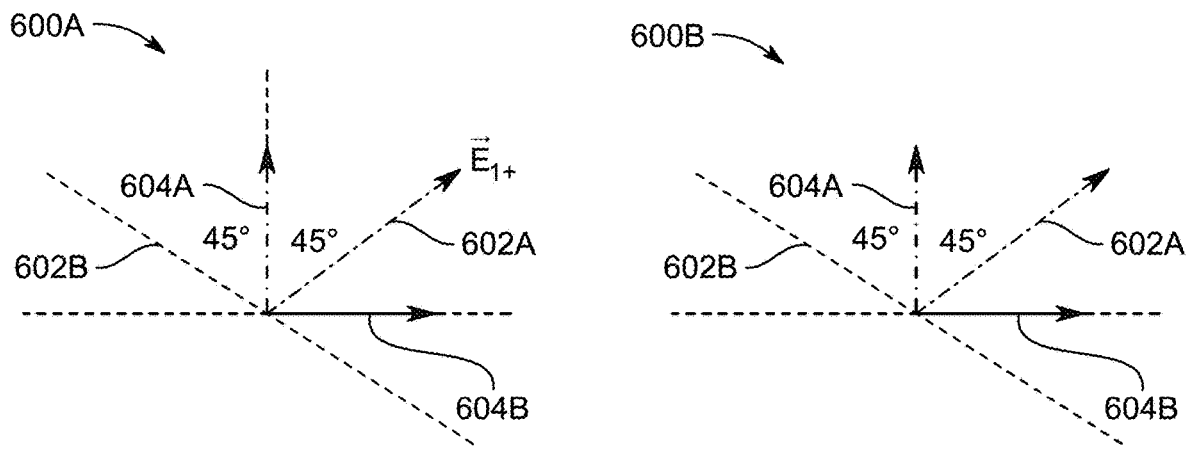
FIG. 6A
FIG. 6B

SYSTEM AND METHOD FOR MITIGATING RAIN-INDUCED CROSSTALK IN WIRELESS COMMUNICATIONS

BACKGROUND

Technical Field

The present disclosure is directed to wireless communication systems and, more particularly, to systems and methods for mitigating environmental interference, such as rain-induced crosstalk, in dual-polarized multiple-input multiple-output (MIMO) transmissions used in unmanned aerial vehicle (UAV) communication.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, unmanned aerial vehicles (UAVs) have revolutionized various sectors, including agriculture, search and rescue operations, and military applications. A critical factor in the effectiveness of these UAVs is the reliability of their communication systems, particularly in challenging environmental conditions. Among them, heavy rain presents a unique and significant challenge, especially in tropical regions.

The primary issue arises from an interference of rain particles with electromagnetic waves used for communication in dual-polarized multiple-input multiple-output (MIMO) systems. This interference often leads to polarization rotation and signal degradation, which can severely impact the performance of UAV communication systems. The adverse effects include reduced signal-to-noise ratio, diminished channel capacity, and increased bit error rates, potentially compromising the operational efficacy of UAVs.

Despite a growing body of research on the UAV communication systems, there remains a significant gap in understanding and mitigating the effects of rain on the polarization of electromagnetic waves. Most existing solutions focus on general atmospheric conditions or conventional obstacles such as buildings and terrain. However, the specific impact of rain particles, particularly their ability to alter wave polarization, has not been thoroughly investigated in the context of the UAVs employing the dual-polarized MIMO systems.

Several approaches have been described to characterize and model the effects of rain on electromagnetic wave propagation. In one approach, a semi-empirical formula was established to relate microwave depolarization to rain attenuation on Earth-space paths, providing a fundamental tool for understanding the effects of rain on signal polarization and attenuation at frequencies ranging from 10 Gigahertz (GHz) to 30 GHz (See: T. Chu, "*A Semi-Empirical Formula for Microwave Depolarization Versus Rain Attenuation on Earth-Space Paths*," IEEE Transactions on Communications, vol. 30, no. 12, pp. 2550-2554 December 1982).

Another approach describes a theoretical evaluation of how different types of tropical rainfall influence microwave and millimeter-wave propagation. This approach models the effects of raindrop size distribution and rain intensity on signal attenuation and phase shifts, emphasizing the importance of using region-specific parameters in the design of communication systems operating in tropical climates (See: M. O. Ajewole, L. B. Kolawole, and G. O. Ajayi, "*Theoretical study of the effect of different types of tropical rainfall on microwave and millimeter-wave propagation*," Radio Science, vol. 34, no. 5, pp. 1103-1124, 1999).

Another approach investigates the impact of ice crystals and raindrop canting angles on differential rain attenuation and cross-polarization discrimination in satellite communication systems. This approach demonstrates that raindrop orientation and shape can substantially influence polarization performance, thereby highlighting the complexity associated with real-world propagation environments (See: J. D. Kanellopoulos and A. D. Panagopoulos, "*Ice crystals and raindrop canting angle affecting the performance of a satellite system suffering from differential rain attenuation and cross-polarization*," Radio Science, vol. 36, no. 5, pp. 927-940, 2001).

Another technique involves an empirical evaluation of rain-induced depolarization on Ku-band satellite signals in tropical environments. This technique reveals significant deviations from existing International Telecommunication Union-Radiocommunication Sector (ITU-R) rain depolarization models, thereby underscoring the importance of location-specific measurements to improve the accuracy of performance predictions in the tropical regions (See: A. Maitra and K. Chakravarty, "*Rain Depolarization Measurements on Low Margin Ku-Band Satellite Signal at a Tropical Location*," IEEE Antennas and Wireless Propagation Letters, vol. 8, pp. 445-448, 2009).

Despite these advancements, existing models and solutions often do not fully account for combined effects of raindrop shape, orientation, and intensity variations encountered in the tropical environments, leading to limitations in the design and optimization of next-generation communication systems operating at the microwave and millimeter-wave frequencies.

Accordingly, it is an object of the present disclosure to provide an improved system and method for accurately modeling and mitigating rain-induced depolarization and attenuation effects on dual-polarized communication links, with a particular focus on tropical rainfall characteristics.

SUMMARY

In an exemplary embodiment, a system for mitigating rain-induced crosstalk in wireless communication between an unmanned aerial vehicle (UAV) and a ground-based receiver is disclosed. The system includes a dual-polarized Multiple-Input Multiple-Output (MIMO) antenna array configured to transmit a signal on an orthogonal polarization channel. The system further includes a rain sensor mounted on the UAV and electrically connected to a processing unit. The system further includes an altitude sensor mounted on the UAV and electrically connected to the processing unit. The system further includes the processing unit including electronic circuitry configured to receive a signal from the rain sensor and receive a signal from the altitude sensor. The electronic circuitry is further configured to calculate a measured phase shift and an attenuation for vertical polarization channel and horizontal polarization channel based on a rainfall intensity and a UAV height. The electronic circuitry is further configured to generate a pre-equalization parameter to compensate for differential phase shifts and attenuation between a vertical polarization channel and a horizontal polarization channel. The system further includes an equalization circuit mounted on a circuit board with the processing unit and electrically connected to the dual-polarized MIMO antenna array. The equalization circuit is configured to receive the pre-equalization parameter from the processing unit. The equalization circuit is further configured to apply the pre-equalization parameter to an input signal received from a communication source within the UAV before the input signal is transmitted through the dual-polarized MIMO antenna array. The equalization circuit is further configured to adjust a phase and an amplitude of each polarization channel to counteract the rain-induced crosstalk.

In another exemplary embodiment, a method for mitigating rain-induced crosstalk in wireless communication from an unmanned aerial vehicle (UAV) is disclosed. The method includes measuring a rainfall intensity in real-time using a rain sensor mounted on the UAV. The method further includes monitoring a UAV height above a ground level using an altitude sensor mounted on the UAV. The method further includes calculating a measured phase shift and an attenuation for a vertical polarization component and a horizontal polarization component based on the measured rainfall intensity, the UAV height, and an elevation angle using a processing unit electrically connected to the rain sensor and the altitude sensor. The method further includes generating a pre-equalization parameter with the processing unit to compensate for a differential effect between a vertical polarization channel and a horizontal polarization channel. The method further includes applying the pre-equalization parameter with an equalization circuit to an input signal received from a communication source within the UAV before the input signal is transmitted through a dual-polarized Multiple-Input Multiple-Output (MIMO) antenna system mounted on the UAV. The method further includes dynamically adjusting the pre-equalization parameter in response to a change in the rainfall intensity.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 5 illustrates a signal equalization architecture implemented in the system, according to certain embodiments.

FIGS. 6A and 6B illustrate a first signal propagation scenario depicting polarization-dependent signal degradation and crosstalk arising due to anisotropic rain media, according to certain embodiments.

DETAILED DESCRIPTION

Figure 1:
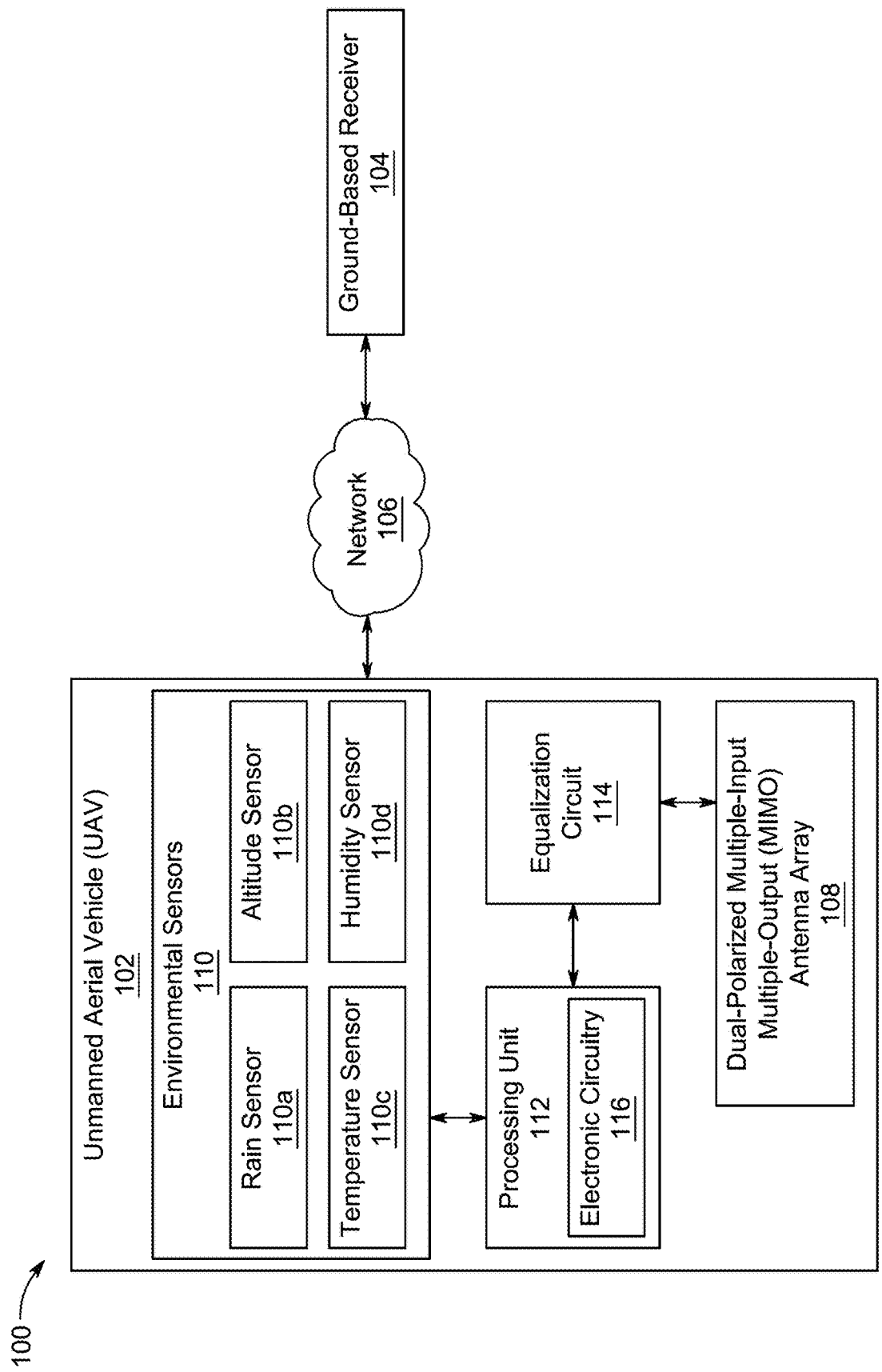
FIG. 1 illustrates a block diagram of a system for mitigating rain-induced crosstalk in wireless communication between an unmanned aerial vehicle (UAV) and a ground-based receiver, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the terms 'height,' 'altitude,' and 'elevation' when referring to the UAV's position are used interchangeably and refer to the vertical distance of the UAV above a reference ground level. Aspects of the present disclosure are directed to a wireless communication system for unmanned aerial vehicles (UAVs) that mitigates rain-induced crosstalk through a dynamic signal pre-equalization in dual-polarized multiple input multiple output (MIMO) transmissions. The present disclosure integrates a dual-polarized MIMO antenna array, environmental sensors, and a real-time adaptive signal processing unit to ensure robust communication in adverse weather conditions. The system utilizes inputs from rain, altitude, temperature, and humidity sensors to assess atmospheric effects on signal polarization. Based on these inputs, the processing unit calculates pre-equalization parameters, compensating for differential phase shifts and attenuation between orthogonally polarized channels. The pre-equalization parameters are applied by an equalization module that adjusts a phase and an amplitude of outgoing signals before transmission, reducing cross-polarization interference.

Conventional UAV communication systems lack an environmental awareness and real-time adaptability required to maintain signal integrity in high-rainfall conditions, particularly in tropical regions. The present disclosure overcomes these limitations by employing continuous environmental sensing and real-time compensation techniques tailored for varying altitudes and rainfall intensities. Supporting both continuous and packet-based transmission modes across a wide frequency range, including 5G and 6G bands, the system ensures low-latency, high-fidelity data transmission. This enables consistent performance in mission-critical applications such as emergency response, surveillance, and autonomous flight operations, even during severe weather events.

FIG. 1 illustrates a block diagram of a system 100 for mitigating rain-induced crosstalk in wireless communication between an unmanned aerial vehicle (UAV) 102 and a ground-based receiver 104, according to certain embodiments. As used herein, the term "rain-induced crosstalk" refers to unintended coupling or leakage of signal energy between orthogonally polarized communication channels in a wireless communication system, caused by an anisotropic scattering, differential attenuation, and phase shifting effects introduced by rain particles.

According to an embodiment of the present disclosure, the UAV 102 and the ground-based receiver 104 may communicate with each other through a network 106. The network 106 may be a data network such as, but not limited to, the Internet, a local area network (LAN), a wide area network (WAN), a metropolitan area network (MAN), and so forth. Embodiments of the present disclosure are intended to include or otherwise cover any type of the data network, including known, related art, and/or later developed technologies.

In some embodiments, the network 106 may be a wired network such as, but not limited to, an Ethernet-based connection, a fiber-optic communication, that connects a cellular network infrastructure to the ground-based receiver 104, ensuring secure and high-speed data transmission. As used herein, the term "cellular network infrastructure" refers to physical and logical components that enable mobile communication, such as fourth generation (4G) and fifth generation (5G) networks.

In yet another embodiment, the network 106 may be a wireless network such as, but not limited to, a cellular network (5G), which enables real-time connectivity between the UAV 102 and the ground-based receiver 104, ensuring low-latency communication and high data transfer rates for remote operations. Embodiments of the present disclosure are intended to include or otherwise cover any type of wired or wireless network, including known, related art, and/or later developed technologies.

In an embodiment, the UAV 102 includes an airborne communication platform configured to establish and maintain a wireless communication link with the ground-based receiver 104, even under adverse environmental conditions such as rainfall. The UAV 102 may be but is not limited to, a fixed-wing UAV, a rotary-wing UAV, a multi-rotor UAV, a hybrid UAV, and so forth. Embodiments of the present disclosure are intended to include or otherwise cover any type of the UAV 102, including known related art and/or later developed technologies.

In an embodiment, the UAV 102 is equipped with a set of sensors, processing electronics, and transmission subsystems designed to support high-frequency, high-integrity data transmission with minimized degradation due to the rain-induced crosstalk. In one embodiment, the UAV 102 operates within a high-frequency millimeter wave band, such as 28 Gigahertz (GHz) or 60 GHz, which falls within a broader 5 GHz to 100 GHz operating frequency range of the system 100 to deliver high-capacity data (e.g., real-time video feeds, telemetry, or sensor data) to the ground-based receiver 104. These frequencies are particularly susceptible to rain attenuation, and the ability of the UAV 102 to sense, calculate, and correct rain-induced signal degradation makes it well-suited for operations in regions with high rainfall variability such as tropical zones or coastal areas. The UAV 102 includes a dual-polarized multiple-input multiple-output (MIMO) antenna array 108, environmental sensors 110, a processing unit 112 and an equalization circuit 114.

The dual-polarized MIMO antenna array 108 (hereinafter referred to as the MIMO antenna array 108) is configured to transmit a signal on an orthogonal polarization channel. In an embodiment, the term "dual-polarized" refers to the capability of each antenna element within the MIMO antenna array 108 to transmit and/or receive signals in two orthogonal polarization states. The orthogonal polarization states may include but are not limited to, vertical and horizontal linear polarization, +45° and −45° linear polarization, or left-hand and right-hand circular polarization, depending on implementation requirements.

As used herein, an 'orthogonal polarization channel' refers to one of two independent communication pathways that utilize electromagnetic waves with polarization states oriented at 90 degrees relative to each other, such that the electric field vectors are perpendicular and do not interfere with each other under ideal propagation conditions. Examples include vertical and horizontal linear polarizations, +45° and −45° linear polarizations, or left-hand and right-hand circular polarizations.

In an embodiment, the MIMO antenna array 108 includes an array of dual-polarized patch antennas, where each patch antenna is designed with two orthogonal feed points that enable simultaneous transmission or reception of the signals on two polarization axes. For instance, one orthogonal feed may support vertical polarization, while another orthogonal feed may support horizontal polarization, allowing spatial and polarization diversity. In another embodiment, the MIMO antenna array 108 may be implemented using crossed-dipole elements or dual-polarized slot antennas, which are inherently capable of supporting orthogonal polarization modes through their geometric structure.

In a preferred embodiment, the MIMO antenna array 108 is mounted on the UAV 102 and is configured to operate within 5 GHz to 100 GHz frequency range, including specific bands such as 28 GHz or 60 GHz bands, which are known to be particularly susceptible to rain-induced attenuation and depolarization effects. The use of orthogonal polarization channels in such a frequency range enhances signal resilience and integrity, under adverse weather conditions.

For example, when the UAV 102 transmits video data and telemetry data simultaneously, the MIMO antenna array 108 may allocate the video data to the +45° polarization channel and the telemetry data to the −45° polarization channel. This separation minimizes mutual interference and allows for differential pre-equalization, compensating for polarization-specific attenuation and phase shifts caused by rain.

In an alternative embodiment, the MIMO antenna array 108 may incorporate beam-steering capabilities. This is achieved through electronic phase shifters integrated into each antenna element, allowing the system 100 to dynamically steer a main lobe of a radiation pattern in real time. Such beam steering capabilities enhance link reliability between the UAV 102 and the ground-based receiver 104, especially during UAV movement or in response to changing atmospheric conditions. Furthermore, in an embodiment, the MIMO antenna array 108 may be enclosed within a radome that is electromagnetically transparent and equipped with hydrophobic coatings or heating elements to reduce water accumulation that may affect polarization purity.

The environmental sensors 110 are mounted on the UAV 102 and are electrically connected to the processing unit 112 to provide real-time atmospheric data used for dynamic signal equalization. In an embodiment, the environmental sensors 110 are distributed across different locations on the UAV 102 to enhance spatial accuracy; for instance, a rain sensor 110a may be placed on an upper fuselage of the UAV 102, while a temperature sensor 110c and a humidity sensor 110d may be positioned near air intakes or propulsion outlets to capture representative air conditions. In another embodiment, the environmental sensors 110 are integrated into a single modular sensor array enclosed in a weather-resistant housing and interfaced with the processing unit 112 via a high-speed serial communication bus such as a serial peripheral interface (SPI), a controller area network (CAN), and so forth. In certain embodiments, the environmental sensors 110 are configured to communicate wirelessly with the processing unit 112 using low-power communication protocols such as ZigBee, wireless fidelity (Wi-Fi), and so forth, particularly useful when the environmental sensors 110 are mounted on movable UAV components. In yet another embodiment, the environmental sensors 110 are co-integrated with an onboard avionics system of the UAV 102, where sensor data is shared through a common data bus.

The environmental sensors 110 are configured to monitor atmospheric conditions that may influence signal propagation and contribute to polarization-dependent degradation in the wireless communication. The environmental sensors 110 may include, but are not limited to, the rain sensor 110a, an altitude sensor 110b, the temperature sensor 110c, the humidity sensor 110d, and so forth.

The rain sensor 110a is mounted on the UAV 102 and is electrically connected to the processing unit 112. The rain sensor 110a is configured to continuously measure rainfall intensity in real time. In one embodiment, the rain sensor 110a includes a capacitive sensor (not shown) with an automatic drainage mechanism that ensures continuous measurement during heavy rain events without signal saturation. In an exemplary embodiment, the capacitive sensor may be configured to detect and quantify the rainfall intensity by measuring changes in capacitance due to the accumulation of water droplets on a sensing surface of the capacitive sensor. The capacitive sensor operates on the principle that the presence of rainwater, which has a significantly higher dielectric constant than air, alters the effective permittivity in the space between conductive plates (not shown) of the capacitive sensor. This alteration in permittivity leads to a measurable variation in capacitance, which is then converted into a digital signal representing a current rainfall rate. To ensure reliable operation during prolonged or intense rainfall events (e.g., exceeding 100 mm/h), the capacitive sensor is equipped with the automatic drainage mechanism, such as a gravity-assisted outlet, a micro-solenoid-controlled valve, or a piezoelectric actuator, that periodically removes excess water from a sensor surface once a predefined capacitance threshold is reached.

The predefined capacitance threshold corresponds to a maximum measurable water volume or dielectric saturation limit beyond which sensor readings may become inaccurate or non-linear. For example, in a high-intensity tropical downpour scenario, where rain accumulation may occur rapidly, the automatic drainage mechanism may be triggered every few seconds to restore the capacitive sensor to its baseline operating condition. The drainage control may be managed by the processing unit 112 based on continuous capacitance monitoring, or through an onboard microcontroller integrated within a housing of the rain sensor 110a. In certain embodiments, a drainage system is enclosed within a hydrophobic coating or self-cleaning enclosure to prevent debris accumulation and ensure sensor longevity. This configuration enables the system 100 to provide uninterrupted, high-resolution rainfall measurements that support real-time equalization and signal compensation functions during dynamic atmospheric conditions encountered in UAV communication environments.

The rain sensor 110a may also include a configurable sampling mechanism electrically connected to the processing unit 112. The configurable sampling mechanism is configured to dynamically adjust a sampling frequency, i.e., the rate at which the rainfall measurements are taken, based on the detected rate of change in the rainfall intensity. Such adaptive sampling ensures both measurement efficiency and responsiveness, particularly in rapidly changing weather conditions.

Specifically, the processing unit 112 continuously monitors a temporal derivative of the rainfall intensity, as measured by changes in sensor capacitance over time. If the rate of change in the rainfall intensity exceeds a predefined threshold (e.g., a 20 mm/h increase within 30 seconds), the configurable sampling mechanism increases the measurement frequency from a default value (e.g., 1 Hz) to a higher rate (e.g., 5 Hz or 10 Hz). This increase enables the system 100 to track sudden spikes or fluctuations in the rainfall, which may significantly impact polarization characteristics and signal integrity in real-time communication links. Conversely, during periods of stable or low rainfall variation, the sampling rate may be reduced to conserve processing resources and power consumption, particularly beneficial in battery-operated UAVs. In certain implementations, the configurable sampling mechanism is realized via a microcontroller-integrated timing module or a software-defined interrupt-driven sampling logic that interfaces directly with the processing unit 112.

The rain sensor 110a may be, but is not limited to, a capacitive rain sensor, an optical rain sensor, a piezoelectric rain sensor, and so forth. Embodiments of the present disclosure are intended to include or otherwise cover any type of the rain sensor 110a, including known related art and/or later developed technologies. Further, the rain sensor 110a is configured to transmit a signal associated with the measured rainfall intensity to the processing unit 112.

The altitude sensor 110b is mounted on the UAV 102 and is electrically connected to the processing unit 112. The altitude sensor 110b is configured to determine a height or an elevation of the UAV 102 above a ground level in real-time. In one embodiment, the altitude sensor 110b may include a barometric pressure sensor, which estimates altitude based on atmospheric pressure changes. As the altitude increases, the atmospheric pressure decreases according to a known exponential relationship. The barometric pressure sensor measures the atmospheric pressure and uses a predefined calibration model to compute a current elevation of the UAV 102 above sea level or above a local ground reference.

In another embodiment, the altitude sensor 110b includes a global navigation satellite system (GNSS)-based altimeter, which calculates the altitude by triangulating a position of the UAV 102 using satellite signals. The GNSS-based altimeter provides high accuracy and global coverage, making them particularly suitable for long-range UAV operations or for use in environments where barometric readings may be unreliable due to temperature or humidity fluctuations.

In yet another embodiment, the altitude sensor 110b includes a laser or light detection and ranging (LiDAR)-based altimeter, which directly measures a vertical distance to a ground surface by emitting a laser pulse and calculating a round-trip time for a reflected signal. This approach provides high-resolution, real-time altitude data, especially useful when the UAV 102 is operating over uneven terrain or urban environments with variable elevation.

For example, during a mission where the UAV 102 is flying at an altitude between 100 meters and 2000 meters above the ground level, the altitude sensor 110b may continuously provide height data at a sampling rate of 10 Hz. The height data is transmitted to the processing unit 112, which uses the height data to calculate the elevation angle between the UAV 102 and the ground-based receiver 104. The elevation angle is, in turn, used to adjust pre-equalization parameters that correct for differential attenuation and phase shifts between vertical and horizontal polarization channels. The altitude sensor 110b is configured to provide a signal associated with the UAV height to the processing unit 112.

The temperature sensor 110c is mounted on the UAV 102 and is electrically connected to the processing unit 112. The temperature sensor 110c is configured to monitor an ambient air temperature surrounding the UAV 102 in real-time. The monitored ambient air temperature is essential for accurately modeling atmospheric propagation conditions, particularly when determining the cause of signal degradation in the system 100. In one embodiment, the temperature sensor 110c includes a digital thermistor, a resistance temperature detector (RTD), a semiconductor-based temperature capable of measuring the ambient air temperature with high precision (e.g., ±0.1° C. accuracy) over a wide operational range (e.g., −40° C. to +85° C.). The temperature sensor 110c continuously samples ambient temperature and transmits measured values of the ambient temperature to the processing unit 112.

In an embodiment, temperature variations affect a dielectric constant (Er) of the atmosphere, which in turn influences phase velocity and attenuation characteristics of the electromagnetic waves propagating through a medium. For instance, at higher temperatures, a refractive index of humid air changes, which may lead to thermal refraction, particularly in a lower atmosphere (troposphere). Such effects may result in a bending of signal paths, phase anomalies, or signal fading, even in the absence of precipitation.

In the context of distinguishing between rain-induced degradation and non-rain-related anomalies, the temperature sensor 110c provides a critical input. For example, if signal attenuation or phase shift is detected by the equalization circuit 114 while the rain sensor 110a reports no significant rainfall (e.g., <5 mm/h), but the temperature sensor 110c indicates high surface temperature (e.g., >35° C.) and low humidity, the system 100 may infer that thermal refraction or atmospheric layering, not precipitation, is likely responsible for the observed signal distortion.

In a contrasting example, during a tropical storm scenario, the temperature sensor 110c may detect a rapid temperature drop (e.g., from 30° C. to 24° C.) along with simultaneous reports of increasing rainfall intensity from the rain sensor 110a. In this case, a temperature profile supports the presence of convective rain activity, and the system 100 may attribute the signal degradation to rain-induced effects such as scattering, absorption, or cross-polarization caused by asymmetric raindrops. The temperature sensor 110c is configured to transmit a signal associated with the monitored ambient air temperature to the processing unit 112.

The humidity sensor 110d is also mounted on the UAV 102 and is electrically connected to the processing unit 112. The humidity sensor 110d is configured to measure atmospheric moisture content expressed as relative humidity (RH) or absolute humidity, in real-time during UAV operation. In one embodiment, the humidity sensor 110d may include a capacitive humidity sensor, a resistive humidity sensor, or optical dew sensor, with high sensitivity to detect a wide range of relative humidity values (e.g., from 0% to 100% RH) with an accuracy of ±1-2%. The humidity sensor 110d detects changes in ambient moisture levels by measuring the variation in electrical properties (such as capacitance or resistance) of a hygroscopic polymer or metal oxide material when exposed to water vapor.

For example, in a capacitive humidity sensor implementation, a thin-film dielectric material is sandwiched between two electrodes. As moisture from the surrounding air diffuses into the dielectric, its dielectric constant increases proportionally to the amount of absorbed water vapor. This results in a change in capacitance, which is processed by onboard electronics and converted into a digital signal representing a current humidity level. The capacitive humidity sensor may sample data continuously or at programmable intervals (e.g., 1 Hz to 10 Hz), and the output is transmitted to the processing unit 112.

In one embodiment, the humidity sensor 110d is used in conjunction with the temperature sensor 110c to calculate a dew point temperature, which is the temperature at which the air becomes saturated, and condensation begins to form. The dew point temperature is computed using well-established thermodynamic equations such as a Magnus-Tetens approximation, based on real-time inputs of temperature (T) and relative humidity (RH).

For example, if the temperature sensor 110c detects the ambient air temperature of 25° C. and the humidity sensor 110d measures the relative humidity of 80%, the processing unit 112 may calculate a dew point of approximately 21.3° C.

The processing unit 112 includes an electronic circuitry 116 configured to receive, analyze, and act upon data obtained from the environmental sensors 110, the MIMO antenna array 108, and communication modules. The processing unit 112 is configured to perform real-time signal processing, decision-making, control of adaptive components (e.g., equalization circuit 114, sampling mechanisms), and communication management. In one embodiment, the processing unit 112 is integrated within a main body (fuselage) of the UAV 102. In another embodiment, the processing unit 112 may be distributed across modular sensor subsystems. In yet another embodiment, the processing unit 112 may be co-located with the MIMO antenna array 108. In another embodiment, the processing unit 112 may be located remotely on the ground-based receiver 104.

The processing unit 112 may be, but is not limited to, a programmable logic control unit (PLC), a microcontroller, a microprocessor, a computing device, a development board, a computer, and so forth. Embodiments of the present disclosure are intended to include or otherwise cover any type of the processing unit 112, including known, related art, and/or later developed technologies.

The processing unit 112 is configured to receive one or more sensor signals via wired or wireless communication links from the environmental sensors 110. The processing unit 112 is configured to receive the signal associated with the rainfall intensity from the rain sensor 110a and the signal associated with the UAV height from the altitude sensor 110b.

Based on the rainfall intensity and the UAV height, the processing unit 112 is configured to calculate a measured phase shift and an attenuation for the vertical polarization channel and the horizontal polarization channel. In an embodiment, the processing unit 112 may be configured to calculate the measured phase shift and the attenuation for the rainfall rate ranging from 50 millimeters per hour (mm/h) to 200 mm/h. In an embodiment, a relative elevation angle (θ) between the UAV 102 and the ground-based receiver 104 may be either predefined, calculated, or dynamically estimated during flight. Using this input data, the processing unit 112 employs empirically derived models to compute the phase shift and attenuation experienced by each polarization channel as the signal propagates through a rain-affected atmosphere.

As used herein, differential phase shifts refers to the difference in phase delay experienced between orthogonal polarization channels when electromagnetic waves propagate through an anisotropic medium such as rain. This phase difference arises because vertically and horizontally polarized wave components experience different propagation velocities and path delays due to the asymmetric shape and orientation of rain particles, resulting in a measurable phase disparity that can degrade signal orthogonality and cause cross-polarization interference.

For the vertically polarized wave, an attenuation Av and a phase shift Øy per unit path length are defined as:

$$A_v = a_v R_v^b, \text{dB/km} \tag{1}$$

$$\phi_v = c_v R_v^d, \text{degrees/km} \tag{2}$$

Likewise, for the horizontally polarized wave, the attenuation AH and Ø per unit path length are defined as:

$$A_H = a_H R_H^b, \text{dB/km} \tag{3}$$

$$\phi_H = c_H R_H^d, \text{degrees/km} \tag{4}$$

where $A_v$ and $\Phi_v$ represent the attenuation and phase shift experienced by the vertically polarized wave, respectively. $A_H$ and $\Phi_H$ represent the attenuation and phase shift experienced by the horizontally polarized wave. R represents the measured rainfall rate in millimeters per hour (mm/h), and parameters $a_v$, b, $c_v$, d, $a_H$, $c_H$ are empirically derived fitting coefficients obtained from experimental measurements of millimeter-wave propagation through the rain.

The empirically derived fitting coefficients are stored in a memory (not shown) accessible to the processing unit 112 and may be dynamically updated based on environmental profiles or geolocation data. In certain embodiments, the processing unit 112 may alternatively use lookup tables or machine learning-based inference models trained on atmospheric datasets to improve the accuracy of phase and attenuation predictions.

The processing unit 112 is configured to generate a pre-equalization parameter to compensate for differential phase shifts and attenuation between the vertical polarization channel and the horizontal polarization channel caused by rain-induced propagation effects. In an embodiment, the processing unit 112 is configured to calculate the pre-equalization parameter based on the elevation angle between the UAV 102 and the ground-based receiver 104.

In an exemplary embodiment, the processing unit 112 is configured to enhance polarization-specific correction by decomposing the vertical polarization channel and the horizontal polarization channel into their corresponding orthogonal electric field components, namely a vertical plane component and a horizontal plane component. This decomposition allows the processing unit 112 to analyze and compensate for the rain-induced effects with higher granularity.

In an embodiment, each dual-polarized signal transmitted or received by the UAV 102 may be represented as a superposition of two orthogonal electromagnetic field components, one oriented in the vertical plane and the other in the horizontal plane. While the vertical polarization channel predominantly corresponds to an electric field vector oscillating in the vertical plane, and the horizontal polarization channel in the horizontal plane, environmental factors such as rain, wind, or scattering may induce cross-polarization or asymmetric degradation across these field orientations. To isolate and accurately compensate for such degradation, the processing unit 112 mathematically separates the composite fields into their individual vertical and horizontal plane components.

Once the decomposition is performed, the processing unit 112 evaluates the rain-induced effect, such as the attenuation and phase shift, independently for the component in each plane. Using empirical models or trained machine learning regressors, the processing unit 112 calculates how the vertical and horizontal electric field components are differentially affected by parameters such as the rainfall rate, a drop shape distribution, the UAV altitude, and the elevation angle. This separation enables the detection of polarization-dependent fading or dispersion that may otherwise be masked in aggregated analysis.

After quantifying rain-induced impairments separately for each electric field plane, the processing unit 112 computes a corresponding set of compensatory parameters. The compensatory parameters include: (i) a compensatory phase adjustment, which corrects for the differential phase shift caused by an asymmetric delay or a refractive index variation between the vertical plane and the horizontal plane; and (ii) a compensatory amplitude adjustment, which normalizes signal strength to counteract rain-induced attenuation imbalance. These adjustments are collectively used to formulate the pre-equalization parameter, which includes a phase correction, and an amplitude correction specifically calculated to reduce a cross-polarization discrimination (XPD) degradation resulting from rain-induced propagation effects.

In an embodiment, the pre-equalization parameter is calculated to counteract a phase shift disparity between a vertical and a horizontal polarization component exceeding 30 degrees per kilometer. Such phase shift disparities, often induced by differential rain attenuation and refractive effects in the atmosphere, can severely disrupt the orthogonality of the dual-polarized MIMO channels, resulting in inter-channel interference, degraded signal quality, and reduced XPD. When the relative phase difference between the vertical and horizontal polarization components exceeds this threshold, constructive and destructive interference patterns emerge, impairing the effectiveness of signal demodulation at a receiver. To address this, the processing unit 112 monitors the calculated phase shift values for each polarization plane, and when the differential phase shift exceeds 30 degrees per kilometer, it triggers a more aggressive phase pre-compensation strategy. This strategy involves generating a compensatory phase term that dynamically adjusts the signal phase for one or both channels in real-time, ensuring that the phase disparity remains within acceptable bounds for coherent reception. By doing so, the processing unit 112 actively maintains polarization orthogonality and minimizes rain-induced crosstalk in high-frequency air-to-ground communication systems operating in the 5 GHz to 100 GHz range. The processing unit 112 is configured to transmit the pre-equalization parameter to the equalization circuit 114.

In certain embodiments, the processing unit 112 is further configured to establish an emergency communication channel during a severe weather event, such as heavy rainfall, storm, or sudden loss of signal quality, to facilitate a rescue operation or transmit high-priority distress signals to a designated ground-based receiver 104 or emergency response unit.

In an embodiment, the system 100 includes a communication management module, either integrated within the processing unit 112 or implemented as a separate hardware or software component, that continuously monitors environmental parameters, including the rainfall intensity, humidity, temperature, and UAV altitude, as well as signal quality metrics such as signal-to-noise ratio (SNR), bit error rate (BER), and link loss duration.

When a predefined severe weather threshold is exceeded (e.g., rainfall intensity >150 mm/h or SNR drops below a critical limit (e.g., preferably set at 6 dB limit) for more than 5 seconds), the communication management module triggers a fail-safe routine (e.g., in certain embodiments, the system 100 is deployed in tropical regions that are characterized by high-intensity rainfall). This routine includes, but is not limited to, prioritizing emergency bandwidth allocation by switching to a low-latency frequency sub-band or modulation scheme optimized for adverse conditions (e.g., lower modulation index, robust forward error correction (FEC) coding, activating a dedicated emergency communication protocol, such as long range (LoRa), satellite fallback, or long term evolution (LTE)-based emergency channel, depending on available hardware on the UAV 102, a transmitting location, the altitude, a weather telemetry, and a UAV status to a preconfigured rescue or emergency operations center, and so forth.

Preferred Operational Thresholds for UAV Communication Integrity include:
Wind Speed: Safe for sustained winds up to 40 km/h; gusts tolerated up to 60 km/h for less than 10 seconds.
Pressure Altitude: Operates safely up to 3000 m above mean sea level (MSL).
Relative Humidity: Stable operation up to 95%.

The equalization circuit 114 is mounted on a circuit board with the processing unit 112 and electrically connected to the MIMO antenna array 108. The equalization circuit 114 is configured to receive the pre-equalization parameter from the processing unit 112. In an embodiment, the equalization circuit 114 may be configured to receive the pre-equalization parameter via one or more interfacing communication links that may include, but are not limited to, high-speed digital buses, serial communication interfaces (e.g., serial peripheral interface (SPI), an inter-integrated circuit ($I^2C$), a universal asynchronous receiver/transmitter (UART)), parallel interfaces, or dedicated signal control lines. In certain embodiments, the processing unit 112 and the equalization circuit 114 may reside on the same integrated circuit (IC) or a printed circuit board (PCB), in which case the pre-equalization parameter transfer may occur over a shared memory interface or through inter-process communication (IPC) mechanisms.

In certain embodiments, the equalization circuit 114 is configured to dynamically update one or more pre-equalization parameters used to compensate for rain-induced signal impairments such as the phase shift and attenuation on both the vertical and horizontal polarization channels. The behavior of the equalization circuit 114 may be adapted based on an underlying transmission mode employed by the UAV communication system.

In one embodiment, the equalization circuit 114 supports a continuous transmission mode, where the UAV 102 transmits a sustained stream of data, such as a high-definition video, sensor telemetry, or control signals. In the continuous transmission mode, the environmental conditions (e.g., rainfall intensity, UAV altitude, humidity, temperature) may vary over time and directly influence signal propagation characteristics. Accordingly, the equalization circuit 114 is configured to perform real-time updates of the pre-equalization parameters. These updates are triggered either periodically or in response to detected changes in environmental sensor readings received from the processing unit 112, allowing the equalization circuit 114 to continuously adapt the compensation parameters to the prevailing atmospheric conditions. This real-time adaptation is critical, as even small delays in compensation may result in significant degradation of a transmitted signal, under dynamic weather conditions. To address this, the system 100 is designed to achieve a low-latency response, with a target measurement-to-adjustment delay of less than 10 milliseconds (ms). This is facilitated by an optimized signal processing pipeline within the processing unit 112 of the UAV 102, which ensures rapid updating of the pre-equalization parameters in near real-time.

In another embodiment, the equalization circuit 114 operates under a packet-based transmission mode, where the UAV 102 transmits information in discrete packets rather than a continuous stream. The transmitted information may include, but is not limited to, sensor logs, telemetry bursts, or periodic control updates. In the packet-based transmission mode, the equalization circuit 114 is configured to update the pre-equalization parameters immediately prior to the transmission of each packet using the most recent environmental data available at the time of transmission. The packet-based transmission mode allows the system 100 to incorporate up-to-date rainfall and atmospheric measurements into each transmission, thereby maintaining high signal integrity without requiring constant real-time adjustments. This selective, on-demand recalibration helps conserve processing resources and reduce power consumption, which is particularly beneficial for battery-operated UAVs.

In either mode, the pre-equalization parameters may include values derived from mathematical models or lookup tables correlating the rainfall intensity, the UAV height, and propagation angle to polarization-specific attenuation and phase shift values, as described in detail above. The equalization circuit 114 may apply the pre-equalization parameters to modulate transmission characteristics such as amplitude, phase, or polarization biasing to achieve compensation. In some embodiments, the equalization circuit 114 may be implemented as a dedicated digital signal processing (DSP) module, an application-specific integrated circuit (ASIC), or a software-defined radio (SDR) component, which receives updated compensation parameters from the processing unit 112 or retrieves them from an onboard memory module.

The equalization circuit 114 is configured to apply the pre-equalization parameter to an input signal received from a communication source within the UAV 102 before the input signal is transmitted through the MIMO antenna array 108. The communication source may include any signal-generating subsystem within the UAV 102, such as a wireless transceiver module (e.g., a 5G/6G radio), a modem, a baseband processor, or a telemetry signal generator. These components are responsible for generating modulated signals required for data communication, navigation, or control.

The input signal provided by the communication source includes dual-channel complex modulated data streams, each corresponding to a distinct polarization path, namely the vertical polarization channel and the horizontal polarization channel. The equalization circuit 114 processes the input signal by embedding phase correction and amplitude correction terms from the pre-equalization parameter into the respective polarization channels. This ensures that rain-induced phase and attenuation disparities are mitigated before the input signal is radiated by the MIMO antenna array 108.

To ensure effective compensation and timely application of the phase correction and amplitude correction terms, the equalization circuit 114 is designed to maintain a measurement-to-adjustment latency of less than 200 milliseconds. The measurement-to-adjustment latency represents a total processing time from the detection of environmental variations (e.g., changes in rain intensity or UAV height) to the application of the updated pre-equalization parameter to an outgoing signal. Such a low-latency design enables near-instantaneous adjustments, preserving signal coherence and minimizing the impact of fast-changing weather conditions on a communication link.

In one embodiment, the equalization circuit 114 is further configured to compensate for signal variation across the UAV 102 operating on an altitude range of 100 meters to 2000 meters above the ground level. This capability ensures that the system 100 may maintain robust signal performance regardless of the flight elevation of the UAV 102. By continuously adjusting the signal characteristics over this altitude range, the equalization circuit 114 helps ensure consistent performance across diverse mission profiles, including low-altitude urban reconnaissance and high-altitude long-endurance operations.

The equalization circuit 114 is also designed to maintain signal integrity for communication signals operating in Fifth Generation (5G) and Sixth Generation (6G) wireless frequency bands. These frequency bands typically fall within a millimeter-wave spectrum, which is highly susceptible to rain-induced attenuation and depolarization effects. In an embodiment, the equalization circuit 114 is capable of sustaining signal fidelity during rainfall events exceeding 100 millimeters per hour. This robustness is achieved by continuously updating the pre-equalization parameter to counteract the increased phase distortion and amplitude fading introduced by such high-intensity precipitation events.

In certain embodiments, the system 100 is deployed in tropical regions that are characterized by high-intensity and frequent rainfall events, which are known to cause substantial attenuation and phase shifts in high-frequency wireless signals, particularly in millimeter-wave communication. The processing unit 112 is configured to establish and maintain the communication link with the ground-based receiver 104 under such challenging environmental conditions. To ensure signal reliability, the system 100 continuously adapts transmission parameters, such as polarization selection, transmission power, and pre-equalization coefficients, based on real-time environmental sensor data, including the rainfall intensity, temperature, humidity, and UAV altitude.

In certain embodiments, the ground-based receiver 104 is implemented as a fixed or mobile terrestrial communication unit configured to receive high-frequency, dual-polarized wireless signals transmitted by the UAV 102. The ground-based receiver 104 is designed to ensure robust and high-integrity signal reception even under adverse environmental conditions, such as heavy rainfall, which causes signal attenuation, phase distortion, and polarization-dependent degradation. In an embodiment, the ground-based receiver 104 may include a dual-polarized antenna system (not shown) configured to support multiple orthogonal polarization states, including but not limited to vertical and horizontal linear polarizations, +45° and −45° linear polarizations, or right-hand and left-hand circular polarizations (RHCP and LHCP).

The dual-polarized antenna system (not shown) feeds received signals into a radio frequency (RF) front-end module including low-noise amplifiers (LNAs) for signal amplification, bandpass filters to suppress out-of-band interference, and frequency down-converters for translating high-frequency signals into intermediate frequencies suitable for digital processing. The RF front-end module is designed to operate across a millimeter-wave spectrum, for example, within 5 GHz to 100 GHz, including operational bands such as 28 GHz, 38 GHZ, and 60 GHz, which are especially susceptible to rain-induced attenuation and polarization crosstalk. In an embodiment, a digital signal processing (DSP) module is further included for demodulating the orthogonal polarization channels, detecting residual amplitude and phase errors caused by depolarization effects, and applying post-equalization or channel estimation techniques to compensate for atmospheric impairments. In systems where the UAV 102 performs pre-equalization, the ground-based receiver 104 may apply minimal post-processing; however, optional adaptive equalization logic may still be enabled to provide additional robustness in highly dynamic weather environments.

The ground-based receiver 104 also includes a communication interface (not shown) for relaying received data to central network nodes or control systems through wired or wireless backhaul (e.g., Ethernet, fiber optic, or cellular), and for interfacing with user-facing display terminals or monitoring units that render real-time video feeds, telemetry, and control information received from the UAV 102. In some embodiments, the ground-based receiver 104 supports a control feedback path for transmitting acknowledgment or control signals back to the UAV 102, enabling full-duplex communication. To enhance environmental resilience, the ground-based receiver 104 may be housed in a weather-sealed enclosure, such as the radome with hydrophobic, anti-icing, or dust-repellent coatings, ensuring continuous performance in rain, snow, or high-humidity conditions. In one variant, the ground-based receiver 104 is integrated with beam-steering antennas or a motorized tracking mount that dynamically aligns with the trajectory of the UAV 102 to maintain a high-gain signal path.

The ground-based receiver 104 may be permanently installed at fixed infrastructure locations such as base stations, control centers, or observation posts. Alternatively, in another embodiment, the ground-based receiver 104 is implemented as a portable or vehicle-mounted unit suitable for rapid deployment in field operations, including disaster relief, emergency rescue, military surveillance, or temporary communication networks. For example, during a flood response operation, the UAV 102 may transmit high-definition video and environmental sensor data via a +45° polarized channel, while the ground-based receiver 104, mounted on an emergency response vehicle, receives the incoming +45° polarized stream and transmits telemetry feedback to the UAV 102 via the −45° channel, thereby maintaining a resilient bidirectional communication link in a challenging tropical environment.

Figure 2:
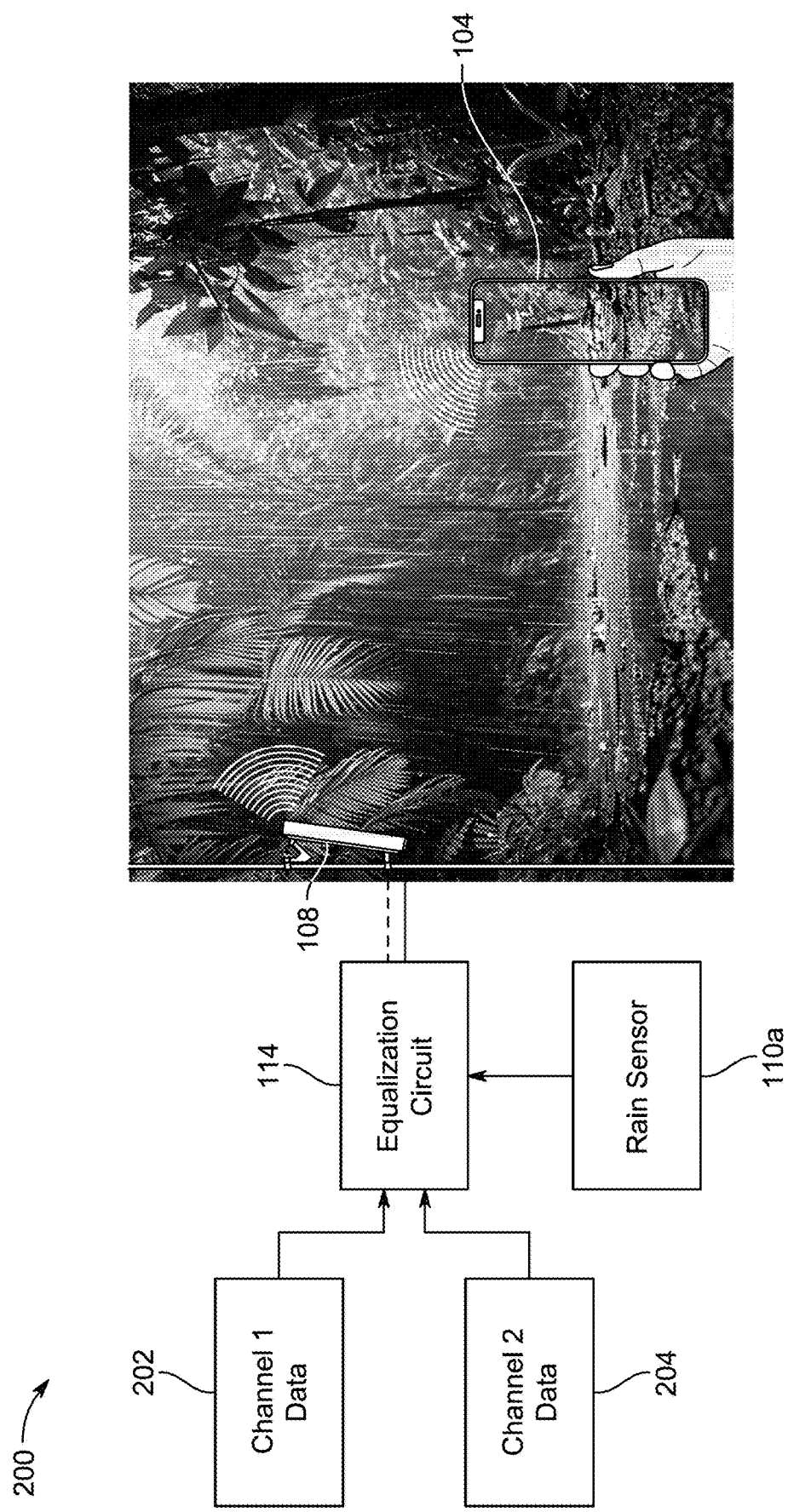
FIG. 2 illustrates an exemplary adaptive pre-equalization system for mitigating the rain-induced crosstalk in the system, according to certain embodiments.

FIG. 2 illustrates an exemplary adaptive pre-equalization system 200 for mitigating the rain-induced crosstalk in the system 100, according to certain embodiments. The adaptive pre-equalization system 200 is suitable for operation in tropical or high-rainfall environments. As depicted, the adaptive pre-equalization system 200 includes multiple functional components configured to ensure reliable high-frequency data transmission in the presence of polarization distortion caused by the rainfall. The adaptive pre-equalization system 200 includes two distinct data input streams, such as channel 1 data 202 and channel 2 data 204, which correspond to orthogonally polarized signal components, such as +45° and −45° linear polarization, or the vertical and horizontal polarization. The data input streams are input to the equalization circuit 114, which dynamically adjusts the phase and amplitude of each polarization channel based on real-time environmental input.

The equalization circuit 114 receives the rainfall intensity data from the rain sensor 110a in real-time, which may utilize capacitive, optical, or piezoelectric technology to measure rainfall rates in millimeters per hour (mm/h). The rainfall intensity data allows the equalization circuit 114 to compute and apply compensation parameters, including phase shift and attenuation corrections, tailored to the detected rain conditions. These adjustments help counteract the rain-induced depolarization and crosstalk, particularly where non-spherical, anisotropic raindrops cause leakage between the polarization channels.

The adjusted signals are then transmitted through the MIMO antenna array 108, shown in FIG. 2 as supporting two orthogonal polarizations. The MIMO antenna array 108 ensures that each pre-equalized signal is propagated along a dedicated polarization path toward the ground-based receiver 104 (e.g., a mobile device). The adaptive pre-equalization preserves the intended signal integrity, allowing reliable reception despite atmospheric distortions.

In FIG. 2, the ground-based receiver 104 is located in a tropical forest experiencing the heavy rainfall. The ground-based receiver 104 may be a user equipment, such as but not limited to, a mobile device, a laptop, a tablet, a computer, and so forth. The visual overlays on the ground-based receiver 104 represent successful demodulation and reconstruction of the received data streams, which may include telemetry, video, or mission-critical messages. The environmental context underscores the applicability of the adaptive pre-equalization system 200 in scenarios involving the rainfall rates exceeding 100 mm/h, which can otherwise severely degrade communication links.

The adaptive functionality of the equalization circuit 114, driven by real-time feedback from the rain sensor 110a, enables the adaptive pre-equalization system 200 to maintain robust and uninterrupted communication links even under extreme weather conditions. Such capability is especially valuable for applications in disaster response, environmental monitoring, or remote mission control, where reliable connectivity is critical.

Figure 3:
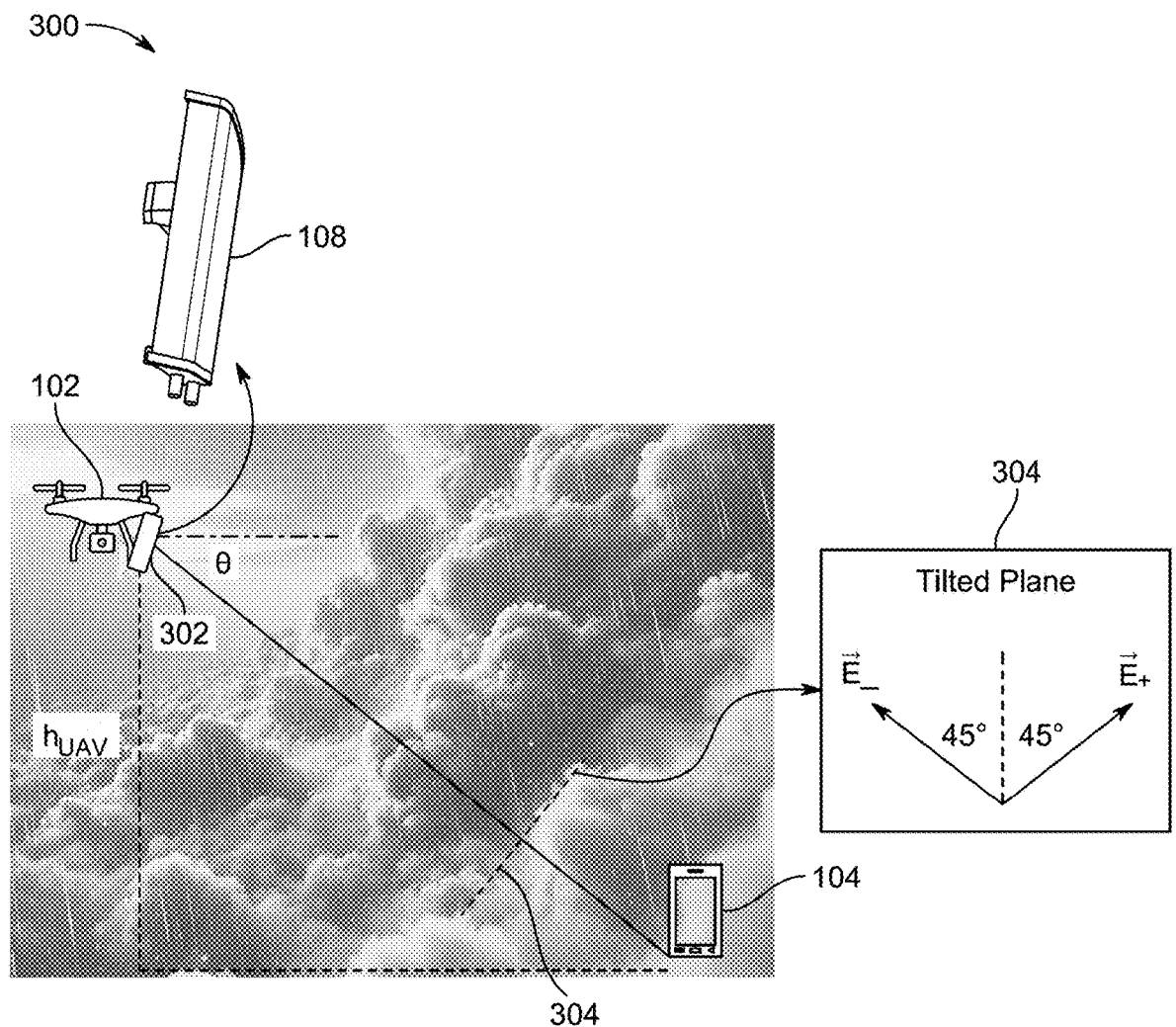
FIG. 3 illustrates an exemplary geometric and environmental configuration for analyzing rain-induced signal attenuation and phase shift in the system, according to certain embodiments.

FIG. 3 illustrates an exemplary geometric and environmental configuration 300 for analyzing rain-induced signal attenuation and phase shift in the system 100, according to certain embodiments. As depicted in FIG. 3, the UAV 102 is flying at a specific altitude denoted as $h_{UAV}$, above the ground-based receiver 104 (e.g., mobile device), transmitting high-frequency wireless signals over the orthogonal polarization channels. The system 100 operates in environments subject to severe rainfall, where propagation characteristics are significantly affected by the atmospheric conditions.

The UAV 102 is equipped with a sensor module 302, which may include a rain sensor (not shown) configured to measure the rainfall intensity in real-time (in mm/h) and an altitude sensor (not shown) configured to determine the elevation angle of the UAV 102 above the ground level. These environmental measurements serve as key inputs to the processing unit 112 for computing compensatory adjustments to signal phase and amplitude.

In an embodiment, the MIMO antenna array 108 is mounted on the UAV 102, which supports simultaneous transmission over the two orthogonal polarization channels (e.g., vertical/horizontal or +45°/−45° linear polarizations). The MIMO antenna array 108 is oriented at an elevation angle θ relative to the ground-based receiver 104. The system 100 may operate under two scenarios: a fixed elevation angle, where θ is predefined for consistent communication with a stationary receiver; or a dynamic elevation angle, where the UAV 102 employs a MIMO inclination control to adjust an orientation of the antenna based on real-time positional feedback, enabling optimized signal alignment with mobile or distributed ground-based receivers.

FIG. 3 further includes a tilted plane 304 marked with electric field vectors $E_+$ and $E_-$, which represent the orthogonal polarization components affected by rain-induced birefringence and anisotropy in a propagation medium. Using real-time sensor data, the processing unit 112 computes the attenuation and phase shift values for each polarization channel using empirically derived models. To compute a total attenuation and total phase shift over a slant path from the UAV 102 to the ground-based receiver 104, the processing unit 112 incorporates an effective path length, which depends on the UAV altitude ($h_{UAV}$) and the elevation angle (θ):

$$\text{Loss}_v = a_v R_v^b \frac{h_{UAV}}{\sin\theta}, \text{dB} \tag{5}$$

$$\Phi_v = c_v R_v^d \frac{h_{UAV}}{\sin\theta}, \text{ degrees} \tag{6}$$

$$\text{Loss}_H = a_H R_H^b \frac{h_{UAV}}{\sin\theta}, \text{ dB} \tag{7}$$

$$\Phi_H = c_H R_H^d \frac{h_{UAV}}{\sin\theta}, \text{ degrees} \tag{8}$$

where $h_{UAV}$ is the vertical height of the UAV 102 above the ground level, and θ is the elevation angle of the signal propagation path from the UAV 102 to the ground-based receiver 104, $\text{Loss}_v$ and $\text{Loss}_H$ are the total attenuation values (in dB) experienced by the vertically and horizontally polarized waves, respectively. $\phi_v$ and $\phi_H$ are the total phase shifts (in degrees) for the respective polarization channels.

By continuously monitoring and adapting to environmental parameters, the UAV 102 ensures robust signal pre-distortion via the equalization circuit 114, enabling reliable, high-integrity communication links with the ground-based receiver 104, even under adverse weather conditions common in the tropical regions.

Figure 4A:
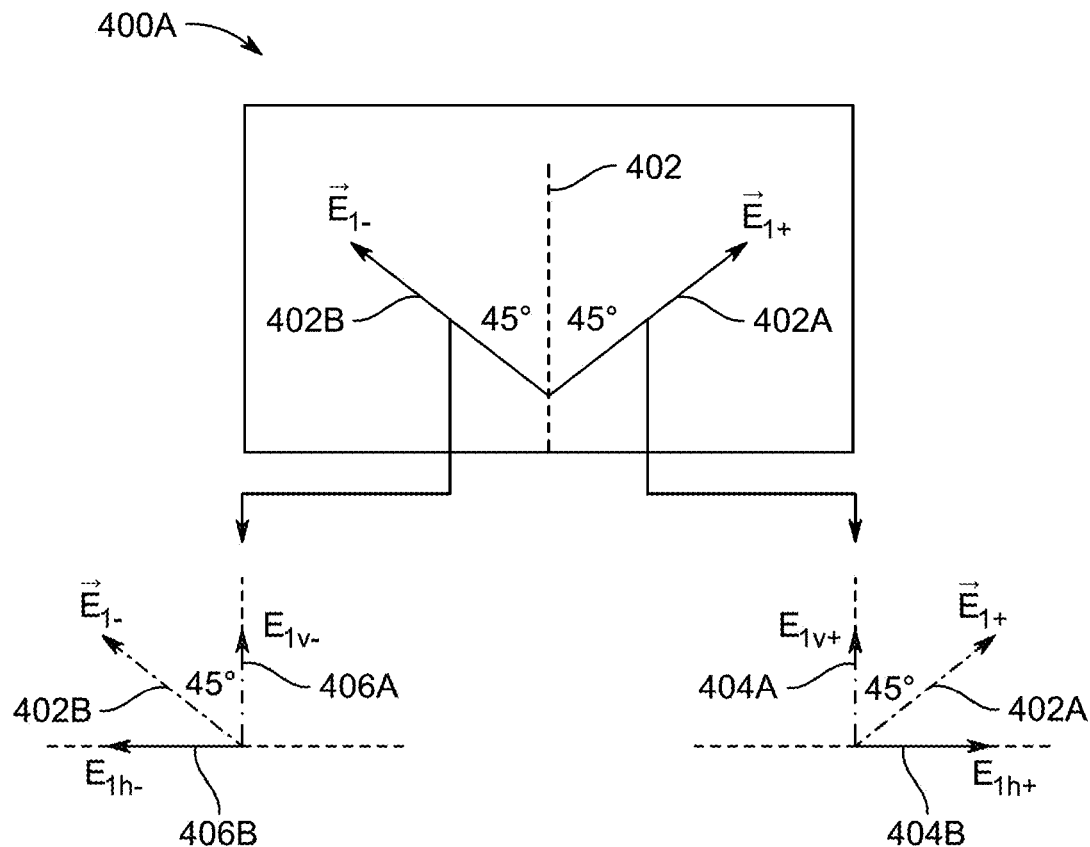
FIGS. 4A and 4B illustrate a decomposition and transformation of orthogonally polarized electromagnetic waves in a vertical plane and a horizontal plane, as the electromagnetic waves propagate through an anisotropic rain medium in the system, according to certain embodiments.
Figure 4B:
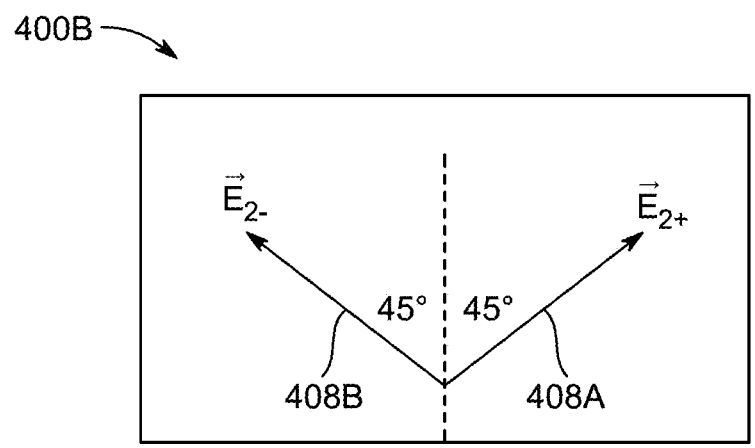

FIGS. 4A and 4B illustrate decomposition and transformation of orthogonally polarized electromagnetic waves in the vertical plane 400A and the horizontal plane 400B, as the electromagnetic waves propagate through an anisotropic rain medium in the system 100, according to certain embodiments.

Prior to describing propagation characteristics, a reference is made to a spatial framework utilized for analysis in conjunction with FIGS. 4A and 4B. The spatial framework includes several key spatial planes and directions that are used throughout the analysis. A plane of a page refers to the vertical plane 400A that contains a line of sight from the UAV 102 to the ground-based receiver 104 and is oriented perpendicular to the ground surface. The vertical plane 400A is defined as being orthogonal to both the plane of the page and the ground surface, while the horizontal plane 400B is parallel to the ground surface and also perpendicular to the plane of the page. A fourth plane, referred to as a titled plane 402, is oriented perpendicular to the line of sight between the UAV 102 and the ground-based receiver 104, forming an angle θ with the vertical plane 400A. The titled plane 402 contains orthogonal polarization vectors $\vec{E}_{1+}$ 402A and $\vec{E}_{1-}$ 402B, oriented at +45° and −45°, respectively, relative to the line lying in the plane of the page and orthogonal to the line of sight (as shown by a dotted line in FIG. 3). The vertical direction lies within the vertical plane 400A, and is perpendicular to the ground surface, defined by the intersection of the vertical plane 400A and the plane of the page. The horizontal direction also lies in the vertical plane 400A but is oriented parallel to the ground surface. This spatial framework provides a geometric basis for analyzing polarization behavior and the interaction of electromagnetic waves with the anisotropic media such as rain, as further illustrated and described in connection with FIGS. 4A and 4B.

According to certain embodiments, FIG. 4A represents the vertical plane 400A, the electric field components corresponding to the vertical projections of the +45° and −45° polarization states, denoted as $\vec{E}_{1+}$ 402A and $\vec{E}_{1-}$ 402B are shown. These electric field components are further decomposed into $E_{1v+}$ 404A and $E_{1h+}$ 404B for $\vec{E}_{1+}$ 402A and $E_{1v-}$ 406A and $E_{1h-}$ 406B or $\vec{E}_{1-}$ 402B, representing the respective projections in the vertical and horizontal directions within the vertical plane 400A. It should be noted that both $\vec{E}_{1+}$ 402A and $\vec{E}_{1-}$ 402B are part of the vertical plane analysis and are thus depicted in FIG. 4A. In contrast, FIG. 4B pertains to the horizontal plane 400B and may typically represent horizontal components $\vec{E}_{2+}$ 408A and $\vec{E}_{2-}$ 408B, which are projections of the polarization states onto the horizontal plane 400B. The vertical plane 400A and the horizontal plane 400B are defined with respect to the direction of wave propagation from the UAV 102 to the ground-based receiver 104.

In operation, the MIMO antenna array 108 transmits the two orthogonal linear polarization states at +45° and −45°, denoted as $E_+$ and $E_-$, respectively. The orthogonal linear polarizations are decomposed into vertical and horizontal reference planes as follows:

$$E_{1+}=E_+ \cos\theta, E_{1-}=E_- \cos\theta, \tag{9}$$

$$E_{2+}=E_+ \sin\theta, E_{2-}=E_- \sin\theta, \tag{10}$$

where θ is the elevation angle between the UAV 102 and the ground-based receiver 104, $E_{1+}$ and $E_{1-}$ are projections onto the vertical plane 400A. $E_{2+}$ and $E_{2-}$ are projections onto the horizontal plane 400B. These decomposed components are used to analyze the polarization behavior through the atmosphere.

In certain embodiments, the electrical field components $E_{1+}$ and $E_{1-}$ in the vertical plane 400A undergo transformation while propagating through the anisotropic medium including elliptically shaped rain particles. The transformation of these electrical field components, denoted as $E'_{1+}$ and $E'_{1-}$ is modeled as a three-step linear operation including a coordinate rotation of the polarization basis by +45°, aligning the field vectors with principal axes of the rain-induced anisotropy; an application of complex transmission coefficients $T_h$ and $T_v$, representing the horizontal and vertical attenuation and phase shift due to the rain medium, respectively; a reverse coordinate rotation by −45°, transforming the field vectors back to an original reference orientation.

The transformation of the electrical field components is expressed mathematically using matrix multiplication as follows:

$$\begin{bmatrix} E'_{1+} \\ E'_{1-} \end{bmatrix} \begin{bmatrix} \cos 45 & -\sin 45 \\ \sin 45 & \cos 45 \end{bmatrix} \begin{bmatrix} T_h & 0 \\ 0 & T_v \end{bmatrix} \begin{bmatrix} \cos 45 & \sin 45 \\ -\sin 45 & \cos 45 \end{bmatrix} \begin{bmatrix} E_{1+} \\ E_{1-} \end{bmatrix} \tag{11}$$

The horizontal and vertical transmission coefficients Th and Tv through the rain particles are given by:

$$T_h = e^{-\text{Loss}_h/2} \times e^{-j\Phi_h} \tag{12}$$

$$T_v = e^{-\text{Loss}_v/2} \times e^{-j\Phi_v} \tag{13}$$

In contrast, electric field components $E_{2+}$ and $E_{2-}$ in the horizontal plane 400B, are affected uniformly by the rain medium and undergo transformation via multiplication by $T_v$.

Since both electric field components in the horizontal plane 400B experience identical scaling and are unaffected by anisotropic variation, they do not contribute to polarization crosstalk between the MIMO channels.

However, the crosstalk between the orthogonal polarization states $E_+$ and $E_-$ arises due to the differential transformation in the vertical plane 400A. The algebraic expansion of the transformation yields:

$$E'_{1+} = \frac{1}{2}[E_{1+}(T_h + T_v) + E_{1-}(T_h - T_v)] \quad (14)$$

$$E'_{1-} = \frac{1}{2}[E_{1+}(T_h - T_v) + E_{1-}(T_h + T_v)] \quad (15)$$

Equations (14) and (15) reveal the exchange of energy between the orthogonal polarization components, leading to signal leakage or interference, commonly referred to as polarization crosstalk. To quantify the extent of this effect, XPD metric is defined as a ratio of an undesired signal component (leakage) to a desired signal component within a given polarization channel. For a special case where $E_{1+}=E_{1-}$, the XPD metric is expressed as:

$$XPD = \frac{|T_h - T_v|}{|T_h + T_v|} \quad (16)$$

where a lower value of XPD indicates greater crosstalk and degraded MIMO channel isolation, under severe rain conditions.

FIG. 5 illustrates a signal equalization architecture 500 implemented in the system 100, according to certain embodiments. The signal equalization architecture 500 is designed to mitigate the polarization crosstalk induced by the anisotropic rain media. The system 100 operates by pre-shaping the input signals fed to each polarization channel of the transmitter of the MIMO antenna array 108 based on real-time rain parameters, such as attenuation and phase shift, thereby ensuring robust high-frequency communication (e.g., in 5G and 6G systems) under variable weather conditions.

FIG. 5 illustrates two input data streams $E_{1+}$ and $E_{1-}$ representing the orthogonal linear polarization components (+45° and −45°, respectively) that correspond to Channel 1 502 and Channel 2 502 of the transmitter. Each of these input data streams undergoes a transformation through a linear system defined by dynamic coefficients derived from environmental sensing data.

As shown in FIG. 5, for the signal $E_{1+}$ (Channel 1 502), two weighted terms are generated:

$$\frac{TE_{1+}}{(T^2 - R^2)} 506$$

representing a co-polarized (desired) signal component and $$\frac{-RE_{1-}}{(T^2 - R^2)} 508$$

representing a pre-shaped cross-polarized component needed to cancel out expected leakage from $E_{1-}$.

These terms are first summed in a first summation unit 514 which performs a signal processing logic, and then passed to a second summation unit 516 that interfaces with a radio frequency (RF) transmission chain, directing an equalized signal output to a Channel 1 transmission (TX) antenna 518. Similarly, for the signal $E_{1-}$ (Channel 2 504), the system 100 generates:

$$\frac{TE_{1-}}{(T^2 - R^2)} 512$$

representing the co-polarized component, and $$\frac{-RE_{1+}}{(T^2 - R^2)} 510$$

represents a counter-leakage component, which is superimposed to minimize mutual interference. These are summed in a first-stage summation unit 520 and then combined in a second-stage summation block 522 before being fed to a Channel 2 TX antenna 524.

The first-stage summation units 514 and 520 are part of real-time digital signal processing logic where computational mixing and coefficient application occur. The second-stage summation units 516 and 522 represent a hardware interface level, combining output streams and driving them into their respective dual-polarized transmission elements. This two-stage summation process ensures accurate formation and routing of the equalized signals.

This process is governed by a matrix equation:

$$\begin{bmatrix} E'_{1+} \\ E'_{1-} \end{bmatrix} \begin{bmatrix} T & R \\ R & T \end{bmatrix} \begin{bmatrix} E_{1+} \\ E_{1-} \end{bmatrix}, \quad (17)$$

where $E'_{1+}$ and $E'_{1-}$ are distorted output fields affected by the rain medium. T and R are complex transmission and crosstalk coefficients, respectively, defined as:

$$T = e^{-\frac{Loss_v}{2}} e^{-j\Phi_v} + e^{-\frac{Loss_h}{2}} e^{-j\Phi_h} \quad (18)$$

$$R = e^{-\frac{Loss_v}{2}} e^{-j\Phi_v} - e^{-\frac{Loss_h}{2}} e^{-j\Phi_h} \quad (19)$$

To reverse the distortion and achieve equalization, the transmitting signals must be pre-shaped using an inverse transformation, as defined below:

$$\begin{bmatrix} E''_{1+} \\ E''_{1-} \end{bmatrix} = \begin{bmatrix} T & R \\ R & T \end{bmatrix} \begin{bmatrix} E_{+eq} \\ E_{-eq} \end{bmatrix} = \begin{bmatrix} E_{1+} \\ E_{1-} \end{bmatrix} \quad (20)$$

$$\begin{bmatrix} E_{+eq} \\ E_{-eq} \end{bmatrix} = \begin{bmatrix} T & R \\ R & T \end{bmatrix}^{-1} \begin{bmatrix} E_{1+} \\ E_{1-} \end{bmatrix} = \frac{1}{(T^2 - R^2)} \begin{bmatrix} T & -R \\ -R & T \end{bmatrix} \begin{bmatrix} E_{1+} \\ E_{1-} \end{bmatrix} \quad (21)$$

The equalized fields $E_{+eq}$ and $E_{-eq}$ are given explicitly as:

$$E_{+eq} = \frac{TE_{1+} - RE_{1-}}{(T^2 - R^2)} \quad (22)$$

$$E_{-eq} = \frac{TE_{1-} - RE_{1+}}{(T^2 - R^2)} \quad (23)$$

The equalized fields $E_{+eq}$ and $E_{+eq}$ are thus fed to the +45° and −45° polarized transmit antennas, respectively, ensuring that after propagation through the anisotropic rain medium, the received signals closely resemble the original undistorted data.

This pre-equalization strategy is particularly effective because it focuses correction efforts on the polarization components in a vertical plane (not shown), where the rain-induced anisotropy leads to differential attenuation and phase shifts. Components in a horizontal plane (not shown) experience isotropic propagation and do not contribute to crosstalk and hence require no equalization.

FIGS. 6A and 6B illustrate a first signal propagation scenario depicting polarization-dependent signal degradation and crosstalk arising due to the anisotropic rain media, according to certain embodiments. The first signal propagation scenario models a simplified transmission event in which only one orthogonal polarization channel is actively carrying data, while other orthogonal polarization channel remains idle. The anisotropic characteristics of rain, modeled here as non-spherical or elliptical raindrops, induce differential attenuation and phase shifts in the vertical and horizontal polarization components of the transmitted signal.

FIG. 6A shows a transmitting plane 600A where an input signal with the electric field $\vec{E}_{1+}$ 602A polarized at +45° with respect to the vertical axis, carries data. This +45° polarization is decomposed into two orthogonal components: a vertical component 604A and a horizontal component 604B, each of magnitude $E_{1+}/\sqrt{2}$. The orthogonal polarization channel (−45° from vertical) 602B is indicated in the figure but carries no data; this channel remains idle.

During propagation through the anisotropic rain medium, as shown in FIG. 6B in a receiving plane 600B, the vertical component 604A and the horizontal component 604B of the signal experience different complex attenuations and phase shifts: the vertical component 604A is attenuated by a factor of $e^{-Loss_v/2}$ and phase shifted by $e^{-j\Phi_v}$ and the horizontal component 604B is attenuated by a factor of $e^{-Loss_h/2}$ and phase shifted by $e^{-j\Phi_h}$.

As a result of the anisotropic propagation, the vertical component 604A becomes:

$$\frac{E_{1+}}{2} e^{-Loss_v/2} e^{-j\Phi_v} \quad (24)$$

and the horizontal component 604B becomes:

$$\frac{E_{1+}}{2} e^{-Loss_h/2} e^{-j\Phi_h} \quad (25)$$

To analyze the crosstalk into the idle −45° polarization direction 602B, these received field components are projected onto the orthogonal axis, yielding a net leaked field as:

$$\frac{E_{1+}}{2} e^{-\frac{Loss_v}{2}} e^{-j\Phi_v} - \frac{E_{1+}}{2} e^{-\frac{Loss_h}{2}} e^{-j\Phi_h} \quad (26)$$

$$= \frac{E_{1+}}{2} \left( e^{-\frac{Loss_v}{2}} e^{-j\Phi_v} - e^{-\frac{Loss_h}{2}} e^{-j\Phi_h} \right) = R \frac{E_{1+}}{2} \quad (27)$$

Also, the field components received by the channel 1 602A are:

$$\frac{E_{1+}}{2} e^{-\frac{Loss_v}{2}} e^{-j\Phi_v} + \frac{E_{1+}}{2} e^{-\frac{Loss_h}{2}} e^{-j\Phi_h} \quad (28)$$

$$= \frac{E_{1+}}{2} \left( e^{-\frac{Loss_v}{2}} e^{-j\Phi_v} + e^{-\frac{Loss_h}{2}} e^{-j\Phi_h} \right) = T \frac{E_{1+}}{2} \quad (29)$$

FIGS. 6A and 6B demonstrate that even when one polarization channel is inactive, anisotropy in the rain medium causes energy from an active channel to leak into the orthogonal idle channel, reducing polarization discrimination and signal fidelity.

Figure 7A:
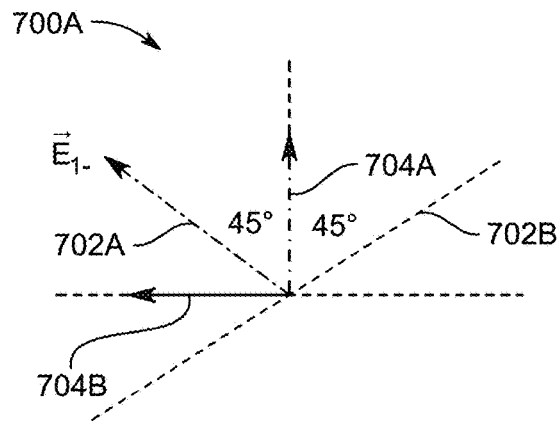
FIGS. 7A and 7B illustrate a second propagation signal scenario depicting the polarization-dependent signal degradation and crosstalk arising due to the anisotropic rain media, according to certain embodiments.
Figure 7B:
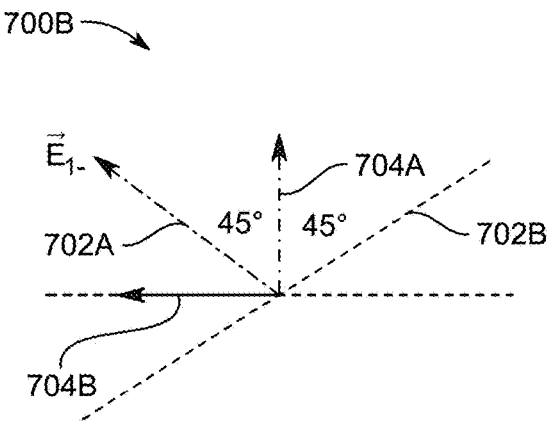

FIGS. 7A and 7B illustrate a second propagation signal scenario depicting the polarization-dependent signal degradation and crosstalk arising due to the anisotropic rain media, according to certain embodiments. FIGS. 7A and 7B depicts a scenario where −45° polarization channel 702A carries data and the +45° polarization channel 702B remains idle. This setup is used to analyze the impact of differential propagation on orthogonal channels and quantify resulting signal leakage.

At a transmitting plane 700A, the electric field $E_{1-}$ 702A which is polarized at −45° with respect to the vertical axis, carries data. This polarization is decomposed into an orthogonal vertical component 704A and a horizontal component 704B, each with a magnitude of $E_{1-}/\sqrt{2}$.

The orthogonal +45° polarized channel 702B represents the idle channel and carries no data. It is shown for reference as it becomes a channel of interest for crosstalk analysis. Upon propagation through the anisotropic medium such as an environment with non-spherical (e.g., elliptical) rain droplets, the vertical component 704A and the horizontal component 704B experience distinct attenuation losses and phase shifts at a receiving plane 700B. The vertical component 704A is affected by Lossy and phase $\phi_v$ and the horizontal component 704B is affected by $Loss_H$ and phase $\phi_h$. The resulting received vertical component 704A and the horizontal component 704B are:

$$\frac{E_{1-}}{2} e^{-Loss_v/2} e^{-j\Phi_v} \quad (30)$$

$$\frac{E_{1-}}{2} e^{-Loss_h/2} e^{-j\Phi_h} \quad (31)$$

The vertical component 704A and the horizontal component 704B are projected onto the orthogonal polarization directions to derive a desired signal received on the −45° channel (co-polarized) 702A:

$$\frac{E_{1-}}{2}e^{-\frac{Loss_v}{2}}e^{-j\Phi_v} + \frac{E_{1-}}{2}e^{-\frac{Loss_h}{2}}e^{-j\Phi_h} \quad (32)$$

$$= \frac{E_{1-}}{2}\left(e^{-\frac{Loss_v}{2}}e^{-j\Phi_v} + e^{-\frac{Loss_h}{2}}e^{-j\Phi_h}\right) = T\frac{E_{1-}}{2}, \quad (33)$$

A leaked signal (crosstalk) received on the +45° channel (cross-polarized) 702B:

$$\frac{E_{1-}}{2}e^{-\frac{Loss_v}{2}}e^{-j\Phi_v} - \frac{E_{1-}}{2}e^{-\frac{Loss_h}{2}}e^{-j\Phi_h} \quad (34)$$

$$= \frac{E_{1-}}{2}\left(e^{-\frac{Loss_v}{2}}e^{-j\Phi_v} - e^{-\frac{Loss_h}{2}}e^{-j\Phi_h}\right) = R\frac{E_{1-}}{2}, \quad (35)$$

where $$T = e^{-\frac{Loss_v}{2}}e^{-j\Phi_v} + e^{-\frac{Loss_h}{2}}e^{-j\Phi_h} \quad (36)$$

$$R = e^{-\frac{Loss_v}{2}}e^{-j\Phi_v} - e^{-\frac{Loss_h}{2}}e^{-j\Phi_h} \quad (37)$$

These relationships capture both the main signal transmission and unwanted leakage due to the anisotropic nature of the propagation medium.

In an embodiment, equations (26)-(35) may be represented in a matrix form given by:

$$\begin{bmatrix} E'_{1+} \\ E'_{1-} \end{bmatrix} = \begin{bmatrix} T & R \\ R & T \end{bmatrix}\begin{bmatrix} E_{1+} \\ E_{1-} \end{bmatrix} \quad (38)$$

To quantify how much of the signal leaks from one polarization to the other, the XPD metric is defined as a power ratio of the leaked signal to the desired signal. When signals are transmitted on both polarization channels ($E_{1+}$ and $E_{1-}$), the XPD is computed as:

$$XPD = \frac{\left|\frac{E_{1-}}{2}e^{-Loss_v/2}e^{-j\Phi_v} - \frac{E_{1-}}{2}e^{-Loss_h/2}e^{-j\Phi_h}\right|^2}{\left|\frac{E_{1+}}{2}e^{-Loss_v/2}e^{-j\Phi_v} + \frac{E_{1+}}{2}e^{-Loss_h/2}e^{-j\Phi_h}\right|} \quad (39)$$

If $E_{1+}=E_{1-}$ the XPD simplifies to:

$$XPD = \left|\frac{e^{-Loss_v/2}e^{-j\Phi_v} - e^{-Loss_h/2}e^{-j\Phi_h}}{e^{-Loss_v/2}e^{-j\Phi_v} + e^{-Loss_h/2}e^{-j\Phi_h}}\right|^2 \quad (40)$$

And in decibel (dB) scale:

$$XPD(dB) = 10\log_{10}\left|\frac{e^{-Loss_v/2}e^{-j\Phi_v} - e^{-Loss_h/2}e^{-j\Phi_h}}{e^{-Loss_v/2}e^{-j\Phi_v} + e^{-Loss_h/2}e^{-j\Phi_h}}\right|^2 \quad (41)$$

This figure thus demonstrates how crosstalk and polarization isolation degradation can occur in anisotropic atmospheric conditions and motivates the use of equalization or compensation techniques to preserve channel orthogonality.

Figure 8:
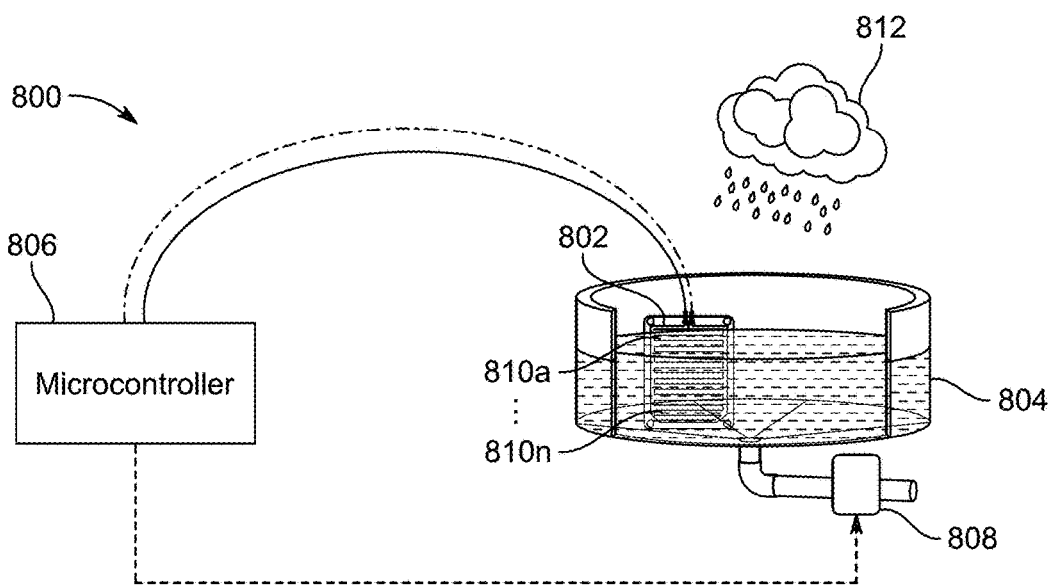
FIG. 8 illustrates a schematic representation of a capacitive rainfall rate sensing system, according to certain embodiments.

FIG. 8 illustrates a schematic representation of a capacitive rainfall rate sensing system 800 (hereinafter referred to as the sensing system 800), according to certain embodiments. The sensing system 800 is configured to detect and respond to rainfall accumulation in real time, enabling low-latency adjustments of transmission parameters under varying environmental conditions, particularly in the tropical regions. The sensing system 800 includes a capacitive sensor 802, a rainwater collection tank 804, a microcontroller 806 and a water discharge valve 808.

In an embodiment, the capacitive sensor 802 is positioned at an upper portion of the rainwater collection tank 804. In an embodiment, the capacitive sensor 802 includes a set of parallel conductive plates 810a-810n exposed to the rainfall. The capacitive sensor 802 is configured to measure changes in capacitance resulting from rainwater accumulation. As the rainwater collects between the parallel conductive plates 810a-810n, an effective dielectric constant increases, thereby raising the capacitance. The capacitive sensor 802 is sensitive primarily to the rainwater as fog, ice crystals, and humidity have negligible impact on its capacitance, thereby ensuring high specificity for rainfall detection.

In an embodiment, the rainwater collection tank 804 is a cylindrical transparent tank that accumulates the rainwater during precipitation events. The rainwater collection tank 804 serves as both a physical reservoir for collecting the rainwater and an environmental interaction unit that influences capacitive sensor readings. The rainwater collection tank 804 provides a controlled medium for analyzing the effect of liquid water on the capacitive sensor output.

In an embodiment, the microcontroller 806 is connected to the capacitive sensor 802 via signal lines. The microcontroller 806 is configured for monitoring the capacitive sensor readings in real time. In an embodiment, the microcontroller 806 implements a derivative-based adaptive algorithm, where the slope of capacitance change over time is used to estimate the rainfall rate. Specifically, the microcontroller 806 calculates the rate at which the measured capacitance increases during successive sampling intervals, with a steeper slope corresponding to a higher rainfall rate. The microcontroller 806 samples the capacitance at an adaptive rate ranging between 5-50 Hz, based on the detected rate of change in the rainfall. Once the rainfall rate is detected, the microcontroller 806 generates a corresponding control signal. In an embodiment, the control signal is used to activate a pre-equalization algorithm within a communication subsystem of the UAV 102 for transmission correction or to transmit a command signal to open the water discharge valve 808 when a predefined water threshold is reached in the rainwater collection tank 804.

In an embodiment, FIG. 8 illustrates a rain cloud icon 812 positioned above the rainwater collection tank 804, symbolizing real rainfall events. Arrows directed downward toward the rainwater collection tank 804 and outward through the water discharge valve 808 represent a physical flow path of the rainwater into and out of the capacitive rainfall rate sensing system 800, respectively. These symbolic elements assist in visualizing the interaction between the rainfall events and a sensor response.

To ensure timely and reliable adjustment of signal transmission parameters in response to rapid environmental variations, the capacitive rainfall rate sensing system 800 is architected for low-latency operation. The signal processing pipeline, in conjunction with high-speed computational capabilities of the processing unit 112 of the UAV 102, achieves an end-to-end latency of less than or equal to 200 milliseconds between the detection of rainfall and the application of corresponding compensation parameters. Such latency performance ensures real-time responsiveness and effective adaptive equalization, particularly in dynamic weather conditions typical of tropical environments.

The water discharge valve 808 is located at a bottom outlet of the rainwater collection tank 804. In an embodiment, the water discharge valve 808 is connected to the microcontroller 806 via an actuation line, to receive the command signal from the microcontroller 806. Based on the received command signal, the water discharge valve 808 may be opened automatically to drain the rainwater from the rainwater collection tank 804. This prevents overflow, maintains sensor accuracy, and ensures proper system reset for subsequent measurements.

Figure 9:
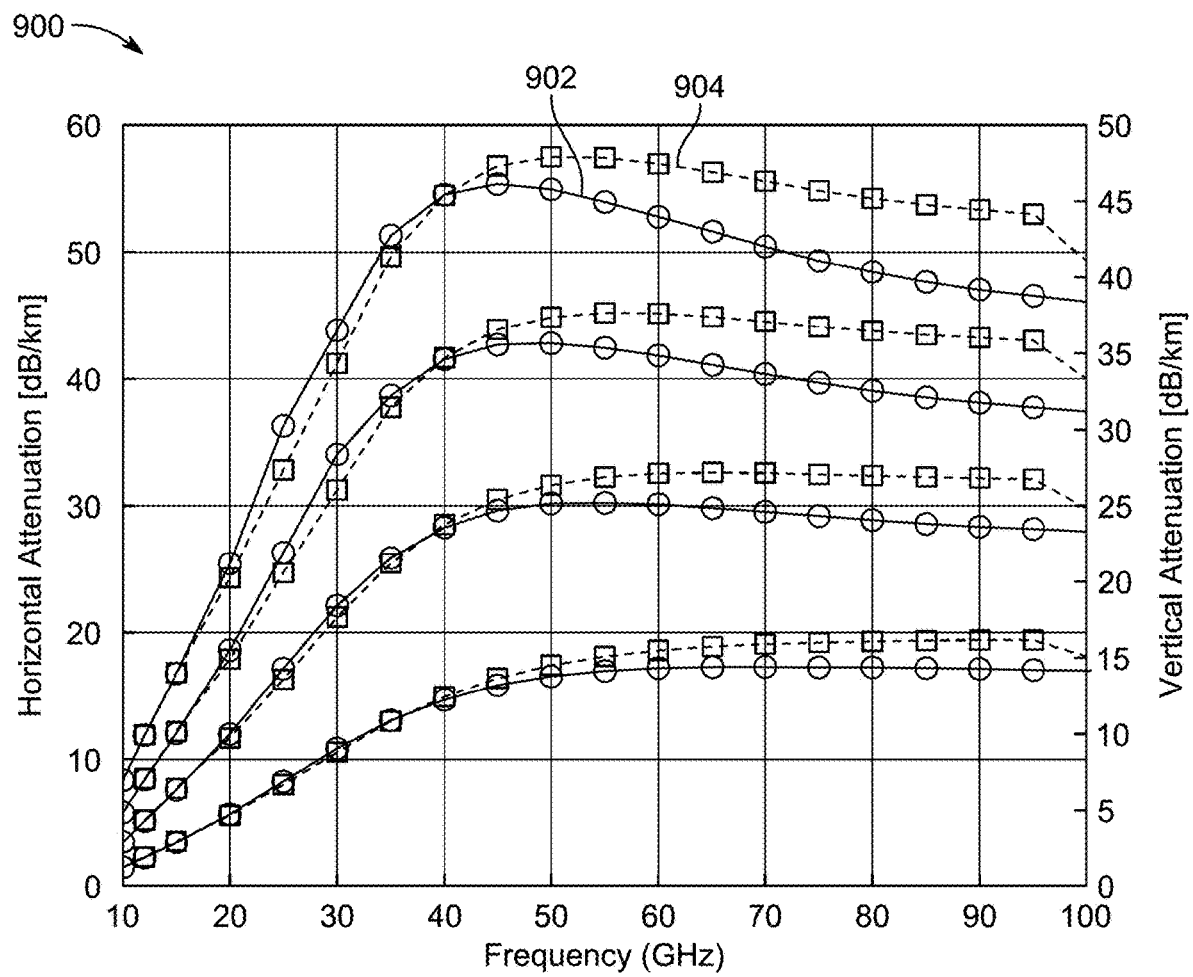
FIG. 9 illustrates a graphical plot of frequency-dependent variations of rain-induced attenuation for both horizontal and vertical polarizations under multiple rainfall intensities, according to certain embodiments.

FIG. 9 illustrates a graphical plot 900 of frequency-dependent variation of rain-induced attenuation for both horizontal and vertical polarizations under multiple rainfall intensities (R=50 mm/h, 100 mm/h, 150 mm/h, and 200 mm/h), according to certain embodiments. The rain-induced attenuation is measured in decibels per kilometer (dB/km), plotted across a frequency range of 10 GHz to 100 GHz. The dual y-axis represents attenuation values: a left axis corresponds to horizontal attenuation AH 902 and a right axis corresponds to vertical attenuation Av 904.

Each line in the graphical plot 900 corresponds to a specific rain rate and polarization combination. Solid circular markers represent the horizontal attenuation AH 902, while dashed square markers indicate the vertical attenuation Av 904. The figure conveys several critical trends related to propagation loss under varying environmental conditions. The data reveals a clear increase in attenuation with frequency for both vertical and horizontal polarizations. This trend is observed consistently across all rain intensity levels, and becomes more pronounced under higher rainfall conditions. Specifically, at frequencies exceeding 30 GHz, within the millimeter-wave (mmWave) band, the effects of electromagnetic wave absorption and scattering by rain droplets intensify, resulting in substantial increases in attenuation. Additionally, there exists a strong dependence of attenuation on the rainfall rate. For any fixed frequency, the higher rainfall intensity results in a greater signal loss. For example, at 60 GHz, the vertical attenuation $A_v$ 904 rises from approximately 17 dB/km at the rain rate of 50 mm/h to more than 47 dB/km at 200 mm/h. This illustrates the significant degradation in link quality that accompanies elevated rainfall levels.

Further, the analysis reveals that vertical polarization consistently undergoes higher attenuation than horizontal polarization at all measured frequencies and rain rates. This discrepancy is primarily attributed to the anisotropic nature of raindrops, which are generally ellipsoidal in shape and cause asymmetric interactions with the electric field vectors depending on their orientation. Consequently, the vertically polarized waves tend to experience stronger absorption and scattering effects compared to the horizontally polarized waves.

Another key observation from the figure is the saturation behavior of attenuation at higher frequencies. Beyond approximately 50-60 GHz, curves of both horizontal attenuation AH 902 and the vertical attenuation Av 904 tend to plateau or exhibit a slight decrease. This saturation effect suggests that the rain-induced scattering and absorption mechanisms reach a limit, beyond which further increases in frequency do not result in proportionate increases in attenuation. This phenomenon has important implications for designing frequency-adaptive communication systems operating in the upper mmWave band.

The insights derived from FIG. 9 support the necessity of real-time adaptive equalization mechanisms in the system 100. Given the dynamic nature of rain-induced attenuation and its dual dependence on frequency and polarization, the system 100 must continuously monitor environmental variables and adjust its transmission parameters, including carrier frequency, modulation scheme, polarization configuration, and coding rate, to maintain robust connectivity. The high attenuation levels observed at elevated frequencies further underscore the need for rain-aware, polarization-sensitive channel adaptation strategies to ensure reliable UAV-ground communication links, especially in storm-prone regions.

Figure 10:
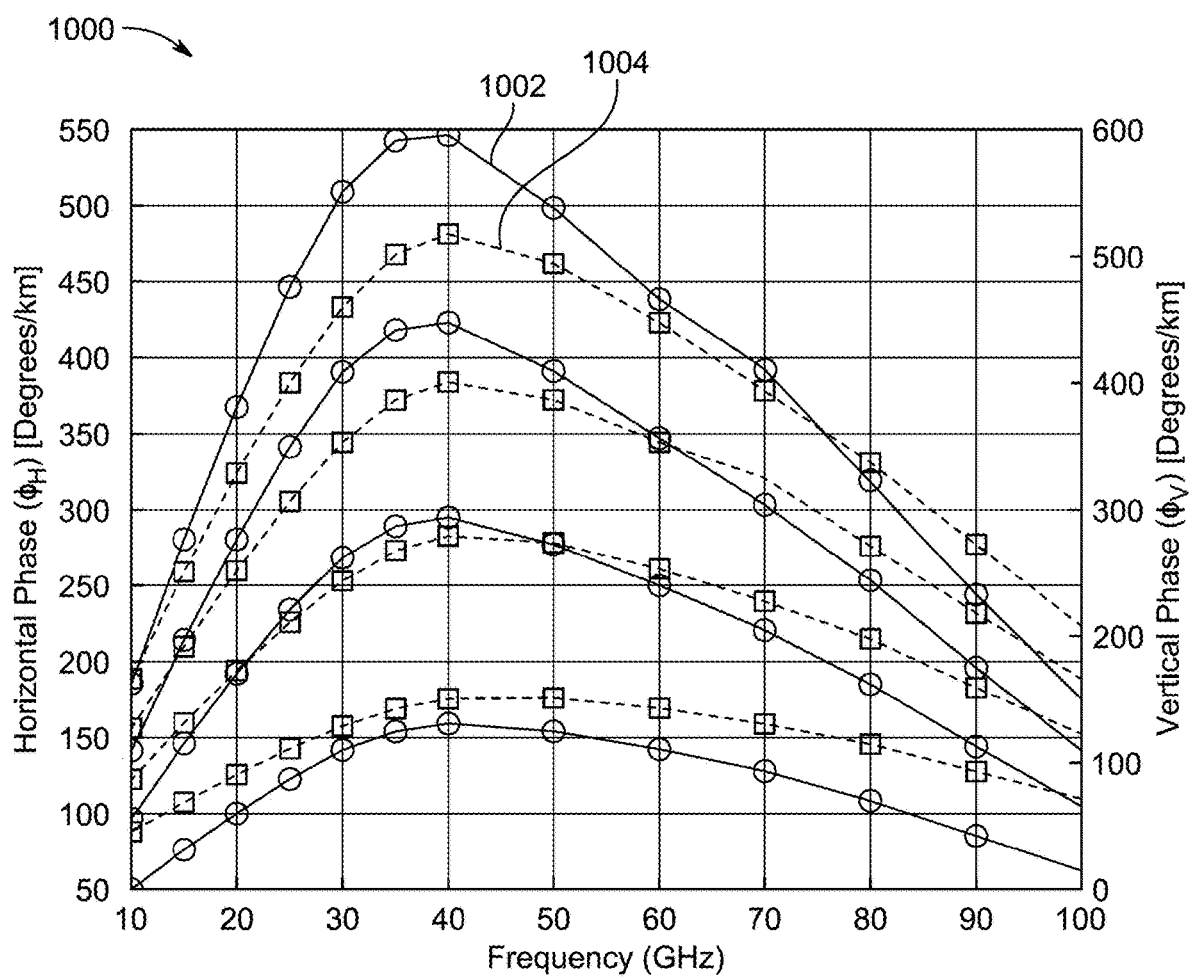
FIG. 10 illustrates a graphical plot of frequency-dependent phase shift variations in dual-polarized multiple input multiple output (MIMO) channels under different rainfall intensities, according to certain embodiments.

FIG. 10 illustrates a graphical plot 1000 of frequency-dependent phase shift variations in dual-polarized MIMO channels under different rainfall intensities, according to certain embodiments. The x-axis represents the frequency in gigahertz (GHz), spanning from 10 GHz to 100 GHz. The dual y-axes capture a magnitude of phase shift experienced by horizontally and vertically polarized waves, respectively. The left y-axis shows horizontal polarization phase shift $\phi_H$ 1002 in degrees per kilometer (°/km), while the right y-axis shows vertical polarization phase shift $\phi_V$ 1004 in degrees per kilometer (°/km).

The graphical plot 1000 includes solid and dashed curves corresponding to multiple rainfall rates (R=50 mm/h, 100 mm/h, 150 mm/h, and 200 mm/h). The solid curves with circular markers denote the horizontal polarization phase shift ($\phi_H$) 1002, while the dashed curves with square markers denote the vertical polarization phase shift ($\phi_V$) 1004. FIG. 10 captures critical variations in the phase shift under increasing frequency and rain intensity conditions, offering valuable insight into rain-induced polarization behavior in high-frequency MIMO communication systems.

The data in FIG. 10 reveals several important trends. First, phase shift values for both horizontal polarization curves QH 1002 and vertical polarization curves $\phi_V$ 1004 increase with frequency up to approximately 40 GHz, after which the horizontal polarization curves $\phi_H$ 1002 and vertical polarization curves $\phi_V$ 1004 exhibit a gradual decline. This bell-shaped trend is consistent across all rainfall rates. Notably, the phase shift values become increasingly pronounced with rising rainfall intensity. For instance, at the frequency of 40 GHz and a rain rate of 200 mm/h, the phase shift in the vertical polarization curve $\phi_V$ 1004 reaches values exceeding 500 degrees/km, whereas the horizontal polarization curve $\phi_H$ 1002 reaches over 400 degrees/km. This demonstrates the severe impact of dense rainfall on the phase integrity of propagating electromagnetic waves.

Crucially, FIG. 10 highlights a persistent and substantial disparity between the horizontal polarization curve $\phi_H$ 1002 and the vertical polarization curve $\phi_V$ 1004 at all frequencies and rain levels. This polarization-specific phase shift differential, often exceeding 50 degrees/km, may have a significant effect on communication systems utilizing dual-polarization MIMO. In an ideal scenario, the horizontal and vertical polarization channels remain orthogonal and isolated; however, the asymmetric interaction of anisotropic raindrops (ellipsoidal in nature) with electric field vectors of each polarization leads to polarization rotation and phase distortion. Consequently, energy from one polarization channel can leak into another orthogonal polarization channel, resulting in what is known as polarization crosstalk.

This polarization rotation becomes problematic in linearly polarized MIMO systems, where the integrity of each channel is crucial in maintaining the separation of data streams. While the phase variation alone does not alter the polarization of the electromagnetic in the case of single polarization or linear transmission, in dual-polarized systems this variation, if not equal across both the polarization channels 1002 and 1004, directly contributes to cross-polar interference.

To quantify this crosstalk effect, the XPD metric is used. A low XPD value indicates severe crosstalk and degraded channel isolation. The data observed in FIG. 10, especially a widening gap between the horizontal polarization curves $\phi_H$ 1002 and the vertical polarization curves $\phi_V$ 1004, underscores the need for real-time phase compensation mechanisms.

Figure 11:
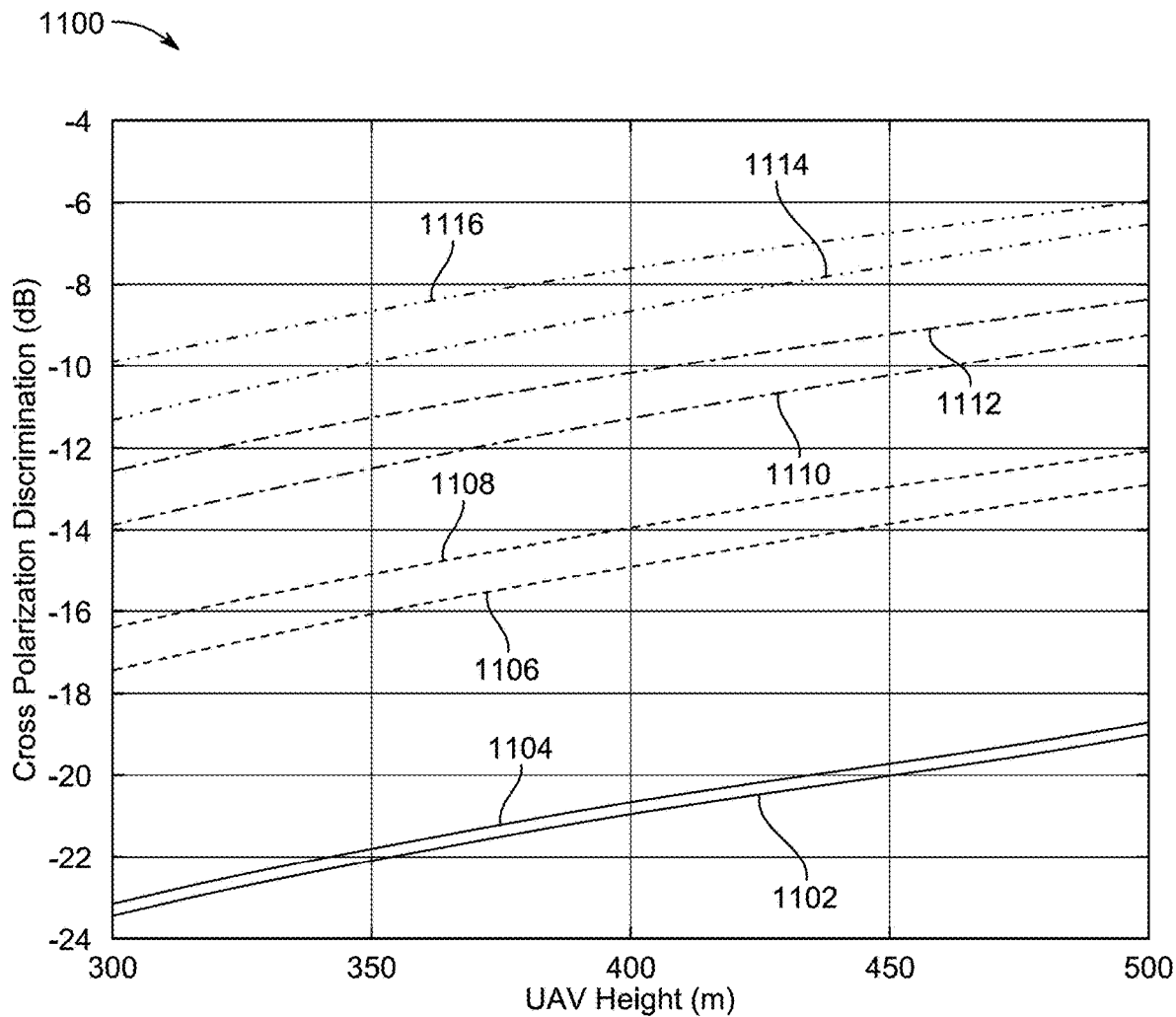
FIG. 11 illustrates a graphical plot of cross-polarization discrimination (XPD) as a function of UAV height under various rainfall intensities and operating frequencies, according to certain embodiments.

FIG. 11 illustrates a graphical plot 1100 of the XPD as a function of the UAV height under various rainfall intensities and operating frequencies, according to certain embodiments. The x-axis represents the UAV height in meters, ranging from 300 to 500 meters, while the y-axis represents the XPD value in decibels (dB), with values decreasing upward from −24 dB to −4 dB. FIG. 11 demonstrates the impact of the rain-induced polarization crosstalk in dual-polarized communication systems as the UAV altitude changes.

The graphical plot 1100 includes eight distinct curves, each representing a different combination of operating frequency (12 GHz or 30 GHz) and rainfall rate (50 mm/h, 100 mm/h, 150 mm/h, and 200 mm/h). For instance, curve 1102 represents the XPD variation for the frequency of 12 GHz under the rainfall rate of 50 mm/h, while curve 1104 depicts the corresponding XPD behavior at 30 GHz under the same rainfall rate. Similarly, curves 1106 and 1108 depict the corresponding XPD behavior corresponding to the frequency of 12 GHz and 30 GHz at the rainfall rate of 100 mm/h, and curves 1110 and 1112 depict the corresponding XPD behavior corresponding to the frequency of 12 GHz and 30 GHz at the rainfall rate of 150 mm/h, and curves 1114 and 1116 depicts the corresponding XPD behavior corresponds to the frequency of 12 GHz and 30 GHz at the rainfall rate of 200 mm/h, respectively.

The trend across all the curves shows that the XPD improves (i.e., becomes less negative) as the UAV height increases. However, for any fixed UAV height, increasing either the rainfall rate or frequency results in a lower XPD value, indicating more severe polarization crosstalk.

The data highlights several important observations. At lower UAV altitudes and higher rain intensities (e.g., 30 GHz with 200 mm/h rainfall), the XPD values drop as low as −6 dB, indicating that approximately 25% of the transmitted signal power leaks into the orthogonal polarization channel. Such high levels of crosstalk may significantly degrade a signal-to-noise ratio (SNR) and increase a bit error rate (BER) in the system 100.

Furthermore, the disparity in the XPD values between the 12 GHz and 30 GHz frequencies becomes more pronounced under increasing rainfall, reinforcing the frequency dependence of polarization integrity. For instance, at 400 m UAV height and 200 mm/h rainfall rate, the XPD at 30 GHz is significantly lower than at 12 GHz, demonstrating the increased vulnerability of mmWave communication to rain-induced polarization distortion.

These insights underscore the critical role of polarization-aware system design, particularly in UAV-based aerial communication systems operating in adverse weather conditions. The trends depicted in FIG. 11 support the need for adaptive real-time equalization mechanisms, which can dynamically correct polarization crosstalk and preserve channel isolation. Moreover, the analysis justifies the deployment of pre-equalization techniques that preemptively mitigate the impact of anisotropic rain particles on signal polarization, thereby maintaining high link reliability and communication efficiency in challenging environments.

Table 1 illustrates empirically derived regression coefficients a and b used to model rain-induced signal attenuation in a tropical climatic region as a function of frequency and polarization. Table 1 provides distinct attenuation coefficients for vertically polarized (V) and horizontally polarized (H) electromagnetic waves across a range of frequencies spanning from 1 GHz to 100 GHz. The attenuation coefficients are critical for implementing adaptive real-time equalization algorithms in a signal compensation module of the system 100.

Each row in Table 1 corresponds to a specific frequency f (in GHz) and lists the corresponding a and b values for both V− and H− polarized waves. For example, at 12 GHz, the vertical polarization exhibits coefficients a=0.0177, b=1.195, whereas the horizontal polarization shows slightly higher attenuation with a=0.0202, b=1.204.

5 These coefficients are used in the processing unit 112 and the equalization circuit 114 to pre-calculate and apply polarization-specific attenuation compensation in real time, especially under varying rainfall intensities. The adaptive compensation ensures signal integrity in UAV-based communication systems operating in high-rainfall environments. The data in Table 1 reveal that the coefficient increases significantly with the frequency, indicating higher baseline attenuation at higher frequencies. The coefficient b, which governs an exponential sensitivity to rainfall rate, initially increases and then gradually decreases at higher frequencies. This trend reflects complex interactions between wave frequency, raindrop size distribution, and scattering behavior in tropical atmospheres.

TABLE 1

| | a | | b | |
| --- | --- | --- | --- | --- |
| f | H | V | H | V |
| 1 | 3.52-5 | 3.11-5 | 0.9273 | 0.894 |
| 2 | 1.42-4 | 1.24-4 | 0.9627 | 0.9323 |
| 4 | 6.51-4 | 5.73-4 | 1.072 | 1.043 |
| 6 | 1.85-3 | 1.63-3 | 1.214 | 1.177 |
| 8 | 4.72-3 | 4.1-3 | 1.273 | 1.253 |
| 10 | 0.011 | 9.24-3 | 1.252 | 1.242 |
| 12 | 0.0202 | 0.0177 | 1.204 | 1.195 |
| 15 | 0.0401 | 0.036 | 1.139 | 1.126 |
| 20 | 0.082 | 0.0748 | 1.083 | 1.057 |
| 25 | 0.1333 | 0.1206 | 1.055 | 1.026 |
| 30 | 0.1977 | 0.1761 | 1.024 | 1.001 |
| 35 | 0.2764 | 0.2438 | 0.986 | 0.9697 |
| 40 | 0.3672 | 0.3228 | 0.9437 | 0.9335 |
| 45 | 0.4648 | 0.4097 | 0.9022 | 0.8963 |

TABLE 1-continued

| | a | | b | |
|---|---|---|---|---|
| f | H | V | H | V |
| 50 | 0.5618 | 0.4984 | 0.8649 | 0.8617 |
| 55 | 0.6507 | 0.5823 | 0.8338 | 0.8321 |
| 60 | 0.7268 | 0.6569 | 0.8089 | 0.8078 |
| 65 | 0.7912 | 0.7213 | 0.7885 | 0.788 |
| 70 | 0.8474 | 0.7779 | 0.7712 | 0.7713 |
| 75 | 0.897 | 0.8281 | 0.7563 | 0.757 |
| 80 | 0.9392 | 0.8714 | 0.7441 | 0.7453 |
| 85 | 0.9718 | 0.9064 | 0.7346 | 0.736 |
| 90 | 0.994 | 0.9321 | 0.7279 | 0.7293 |
| 95 | 1.007 | 0.949 | 0.7235 | 0.7248 |
| 100 | 1.011 | 0.895 | 0.7209 | 0.7221 |

Table 2 presents empirically determined regression coefficients c and d that characterize phase shift variations in vertically (V) and horizontally (H) polarized electromagnetic waves as a function of frequency in rain-affected tropical environments. The regression coefficients are integral in calculating the rain-induced differential phase shift used in the pre-equalization algorithm implemented by the equalization circuit 114 of the system 100.

Each row in Table 2 corresponds to a specific operating frequency f (in GHz) and provides corresponding values of c and d for both vertical and horizontal polarizations. For instance, at 20 GHz, the vertical polarization exhibits c=2.41, d=0.928, while the horizontal polarization exhibits c=2.58, d=0.936. The higher phase shift for horizontal polarization reflects the anisotropic nature of the rain medium and the different interaction characteristics of electromagnetic waves based on polarization alignment with elongated raindrop shapes.

These coefficients enable the real-time compensation of phase distortions induced by differential propagation delays in the dual-polarized communication channels. The processing unit 112 utilizes these coefficients to compute precise pre-equalization values that are applied by the equalization circuit 114 to correct for phase misalignment. This compensation is critical for phase-sensitive MIMO techniques, such as polarization division multiplexing (PDM), where phase mismatch can lead to inter-symbol interference and degraded system performance.

From Table 2, it is observed that the coefficient c increases with frequency up to around 35-60 GHz, indicating stronger phase shift effects at mid-to-high microwave bands and the exponent d, representing a non-linear response to the rainfall rate, remains close to 0.9 across most frequencies, with a slight decline at higher bands (e.g., 100 GHz), which may be attributed to absorption saturation effects and reduced sensitivity to heavier rain rates.

These regression coefficients may be derived through field measurements, simulation-based channel modeling, or statistical curve fitting, and may be stored in a lookup table accessible by the processing unit 112. The ability to adjust phase compensation dynamically based on frequency, polarization, and real-time rainfall estimates ensures that the UAV 102 maintains high signal fidelity, reduced bit error rate, and robust channel orthogonality under varying weather conditions.

Thus, the coefficients c and d listed in Table 2 form a core part of the equalization and adaptive signal processing strategy in high-frequency, rain-affected communication systems.

TABLE 2

| | c | | d | |
|---|---|---|---|---|
| f | H | V | H | V |
| 1 | 0.124 | 0.116 | 0.935 | 0.927 |
| 5 | 0.627 | 0.585 | 0.938 | 0.930 |
| 10 | 1.27 | 1.19 | 0.941 | 0.933 |
| 15 | 1.93 | 1.80 | 0.940 | 0.932 |
| 20 | 2.58 | 2.41 | 0.936 | 0.928 |
| 25 | 3.22 | 3.01 | 0.931 | 0.923 |
| 30 | 3.85 | 3.59 | 0.922 | 0.916 |
| 35 | 4.42 | 4.15 | 0.908 | 0.905 |
| 40 | 4.92 | 4.64 | 0.889 | 0.890 |
| 50 | 5.64 | 5.39 | 0.846 | 0.853 |
| 60 | 5.97 | 5.78 | 0.811 | 0.821 |
| 70 | 5.87 | 5.77 | 0.788 | 0.798 |
| 80 | 5.30 | 5.35 | 0.772 | 0.784 |
| 90 | 4.42 | 4.58 | 0.757 | 0.771 |
| 100 | 3.48 | 3.73 | 0.740 | 0.758 |

Figure 12:
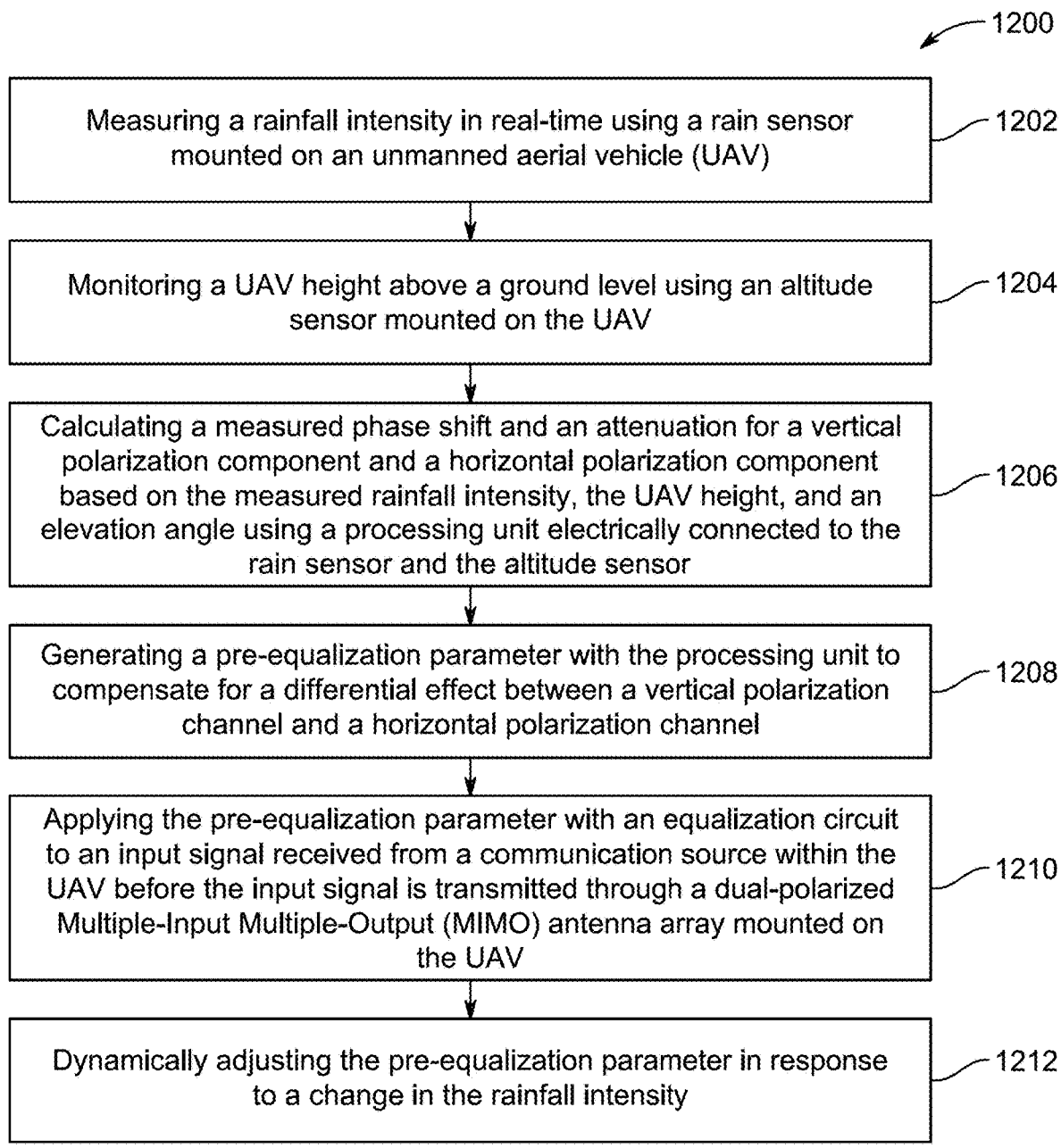
FIG. 12 illustrates a flowchart of a method for mitigating the rain-induced crosstalk in the wireless communication from the UAV, according to certain embodiments.

FIG. 12 illustrates a flowchart of a method 1200 for mitigating the rain-induced crosstalk in the wireless communication from the UAV 102, according to certain embodiments. The method 1200 includes a series of steps. These steps are only illustrative, and other alternatives may be considered where one or more steps are added, one or more steps are removed, or one or more steps are provided in a different sequence without departing from the scope of the present disclosure.

At step 1202, the method 1200 includes measuring the rainfall intensity in real-time using the rain sensor 110a mounted on the UAV 102.

At step 1204, the method 1200 includes monitoring the UAV height above the ground level using the altitude sensor 110b mounted on the UAV 102.

At step 1206, the method 1200 includes calculating the measured phase shift and the attenuation for the vertical polarization component and the horizontal polarization component based on the measured rainfall intensity, the UAV height, and the elevation angle using the processing unit 112 electrically connected to the rain sensor 110a and the altitude sensor 110b.

At step 1208, the method 1200 includes generating the pre-equalization parameter with the processing unit 112 to compensate for the differential effect between the vertical polarization channel and the horizontal polarization channel.

At step 1210, the method 1200 includes applying the pre-equalization parameter with the equalization circuit 114 to the input signal received from the communication source within the UAV 102 before the input signal is transmitted through the dual-polarized MIMO antenna array 108 mounted on the UAV 102.

At step 1212, the method 1200 includes dynamically adjusting the pre-equalization parameter in response to the change in the rainfall intensity.

Figure 13:
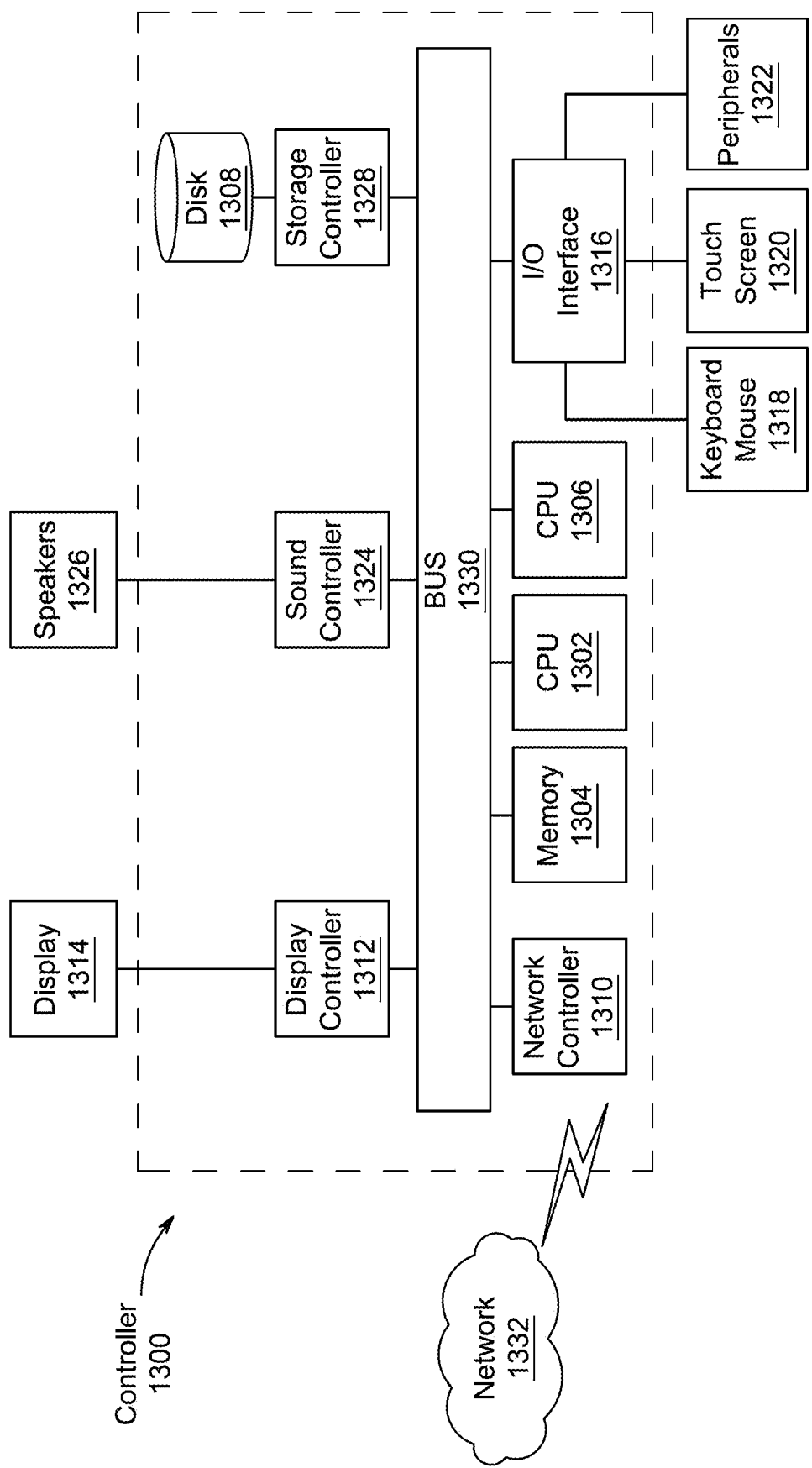
FIG. 13 is an illustration of a non-limiting example of details of computing hardware used in a computing system, according to certain embodiments.

Next, further details of the hardware description of the computing environment according to exemplary embodiments are described with reference to FIG. 13. In FIG. 13, a controller 1300 is described as representative of the system 100 of FIG. 1, in which the controller 1300 includes a CPU 1302 which performs the processes described above/below. The process data and instructions may be stored in memory 1304. These processes and instructions may also be stored on a storage medium disk 1308 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1302, 1306 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1302 or CPU 1306 may be a Xenon or Core processor from Intel of America or an Opteron processor from AMD of America, or may be other processor types that would be recognized by one of ordinary skill in the art. Alternatively, the CPU 1302, 1306 may be implemented on an FPGA, ASIC, PLD or using discrete logic circuits, as one of ordinary skill in the art would recognize. Further, CPU 1302, 1306 may be implemented as multiple processors cooperatively working in parallel to perform the instructions of the inventive processes described above.

The computing device in FIG. 13 also includes a network controller 1310, such as an Intel Ethernet PRO network interface card from Intel Corporation of America, for interfacing with network 1332. As can be appreciated, the network 1332 can be a public network, such as the Internet, or a private network such as an LAN or WAN network, or any combination thereof and can also include PSTN or ISDN sub-networks. The network 1332 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1312, such as a NVIDIA GeForce GTX or Quadro graphics adaptor from NVIDIA Corporation of America for interfacing with display 1314, such as a Hewlett Packard HPL2445w LCD monitor. A general purpose I/O interface 1316 interfaces with a keyboard and/or mouse 1318 as well as a touch screen panel 1320 on or separate from display 1310. General purpose I/O interface also connects to a variety of peripherals 1314 including printers and scanners, such as an OfficeJet or DeskJet from Hewlett Packard.

A sound controller 1324 is also provided in the computing device such as Sound Blaster X-Fi Titanium from Creative, to interface with speakers/microphone 1326 thereby providing sounds and/or music.

The general purpose storage controller 1328 connects the storage medium disk 1308 with communication bus 1330, which may be an ISA, EISA, VESA, PCI, or similar, for interconnecting all of the components of the computing device. A description of the general features and functionality of the display 1314, keyboard and/or mouse 1318, as well as the display controller 1312, storage controller 1328, network controller 1310, sound controller 1324, and general purpose I/O interface 1316 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 14.

Figure 14:
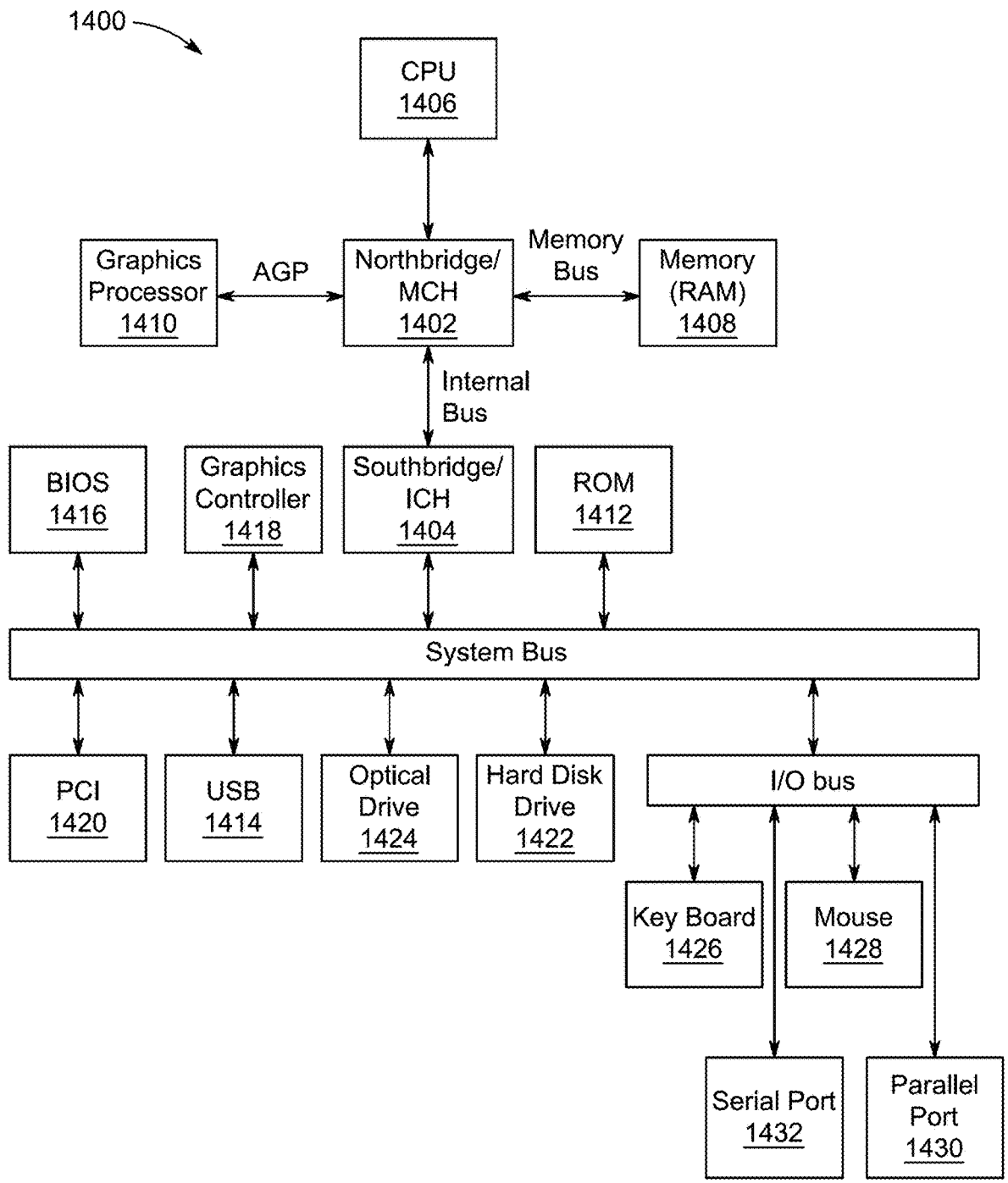
FIG. 14 is an exemplary schematic diagram of a data processing system used within the computing system, according to certain embodiments.

FIG. 14 shows a schematic diagram of a data processing system 1400, according to certain embodiments, for performing the functions of the exemplary embodiments. The data processing system is an example of a computer in which code or instructions implementing the processes of the illustrative embodiments may be located.

In FIG. 14, data processing system 1400 employs a hub architecture including a north bridge and memory controller hub (NB/MCH) 1402 and a south bridge and input/output (I/O) controller hub (SB/ICH) 1404. The central processing unit (CPU) 1406 is connected to NB/MCH 1402. The NB/MCH 1402 also connects to the memory 1408 via a memory bus, and connects to the graphics processor 1410 via an accelerated graphics port (AGP). The NB/MCH 1402 also connects to the SB/ICH 1404 via an internal bus (e.g., a unified media interface or a direct media interface). The CPU Processing unit 1406 may contain one or more processors and even may be implemented using one or more heterogeneous processor systems.

Figure 15:
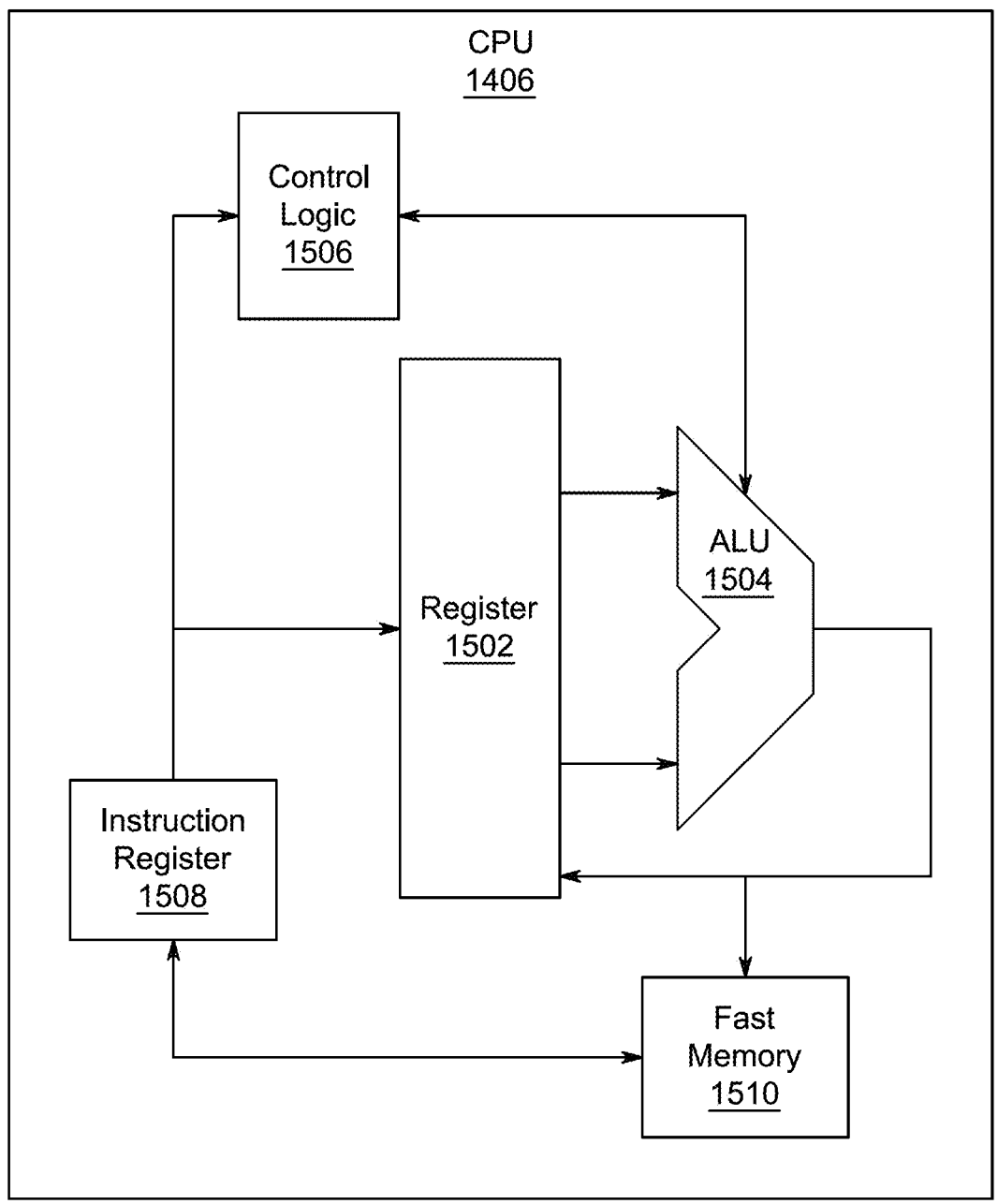
FIG. 15 is an exemplary schematic diagram of a processor used with the computing system, according to certain embodiments.

For example, FIG. 15 shows one implementation of CPU 1406. In one implementation, the instruction register 1508 retrieves instructions from the fast memory 1510. At least part of these instructions are fetched from the instruction register 1508 by the control logic 1506 and interpreted according to the instruction set architecture of the CPU 1506. Part of the instructions can also be directed to the register 1502. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1504 that loads values from the register 1502 and performs logical and mathematical operations on the loaded values according to the instructions. The results from these operations can be feedback into the register and/or stored in the fast memory 1510. According to certain implementations, the instruction set architecture of the CPU 1406 can use a reduced instruction set architecture, a complex instruction set architecture, a vector processor architecture, a very large instruction word architecture. Furthermore, the CPU 1406 can be based on the Von Neuman model or the Harvard model. The CPU 1406 can be a digital signal processor, an FPGA, an ASIC, a PLA, a PLD, or a CPLD. Further, the CPU 1406 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 14, the data processing system 1400 can include that the SB/ICH 1404 is coupled through a system bus to an I/O Bus, a read only memory (ROM) 1412, universal serial bus (USB) port 1414, a flash binary input/output system (BIOS) 1416, and a graphics controller 1418. PCI/PCIe devices can also be coupled to SB/ICH 1404 through a PCI bus 1420.

The PCI devices may include, for example, Ethernet adapters, add-in cards, and PC cards for notebook computers. The Hard disk drive 1422 and CD-ROM 1424 can use, for example, an integrated drive electronics (IDE) or serial advanced technology attachment (SATA) interface. In one implementation the I/O bus can include a super I/O (SIO) device.

Further, the hard disk drive (HDD) 1422 and optical drive 1424 can also be coupled to the SB/ICH 1404 through a system bus. In one implementation, a keyboard 1426, a mouse 1428, a parallel port 1430, and a serial port 1432 can be connected to the system bus through the I/O bus. Other peripherals and devices that can be connected to the SB/ICH 1404 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 16:
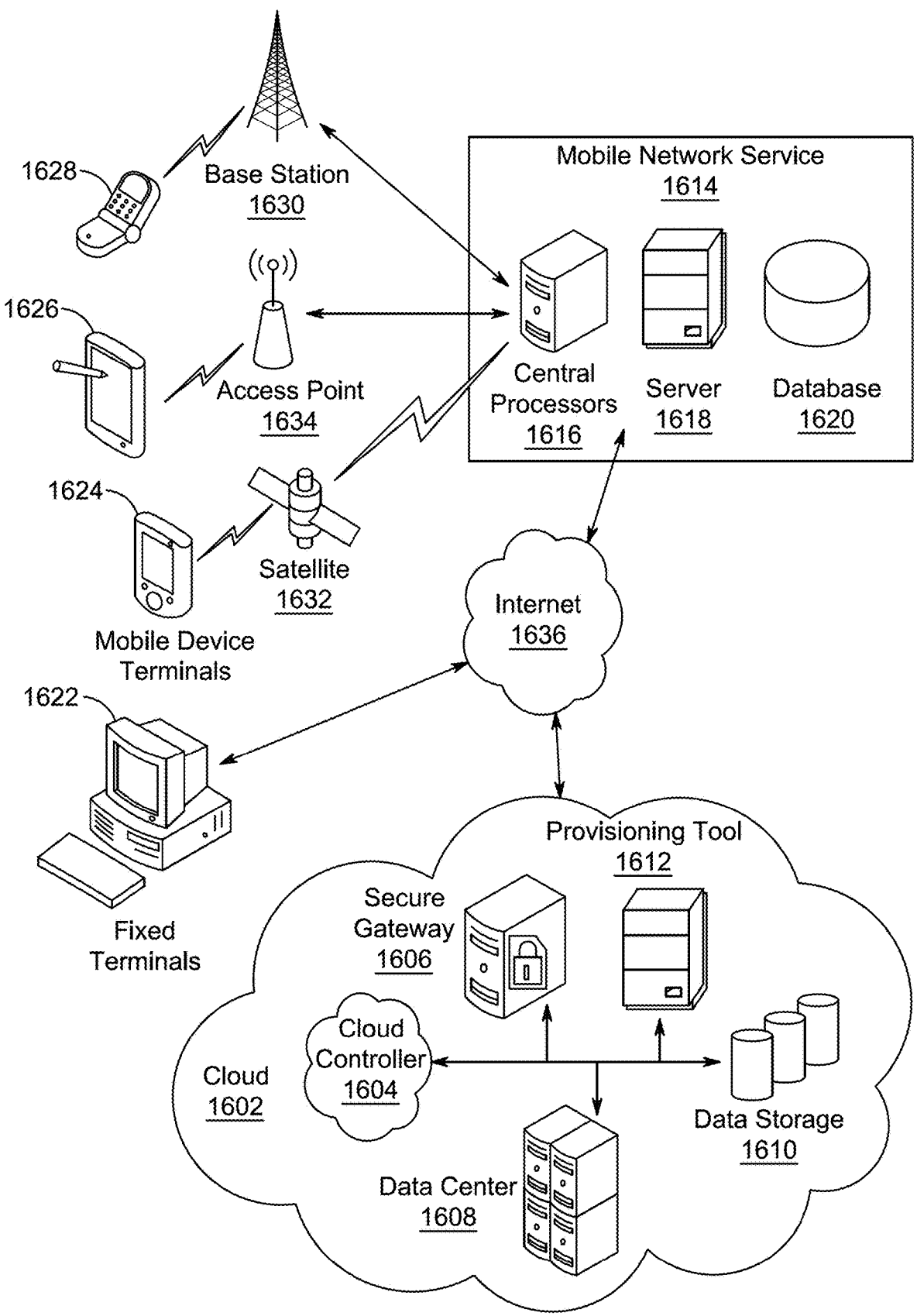
FIG. 16 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1602 including a cloud controller 1604, a secure gateway 1606, a data center 1608, data storage 1610 and a provisioning tool 1612, and mobile network services 1614 including central processors 1616, a server 1618 and a database 1620, which may share processing, as shown by FIG. 16, in addition to various human interface and communication devices (e.g., display monitors 1622, smart phones 1628, tablets 1626, personal digital assistants (PDAs) 1624). The network may be a private network, such as a LAN, satellite 1632 or WAN 1634, or be a public network 1630, may such as the Internet 1636. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A system for mitigating rain-induced crosstalk in wireless communication between an unmanned aerial vehicle (UAV) and a ground-based receiver, the system comprising:
    a dual-polarized Multiple-Input Multiple-Output (MIMO) antenna array mounted on the UAV and configured to transmit a signal on an orthogonal polarization channel;
    a rain sensor mounted on the UAV and electrically connected to a processing unit mounted on the UAV;
    an altitude sensor mounted on the UAV and electrically connected to the processing unit;
    the processing unit comprising electronic circuitry configured to:
        receive a signal from the rain sensor and receive a signal from the altitude sensor;
        calculate a measured phase shift and an attenuation for a vertical polarization channel and a horizontal polarization channel based on a rainfall intensity and a UAV height; and
        generate a pre-equalization parameter to compensate for differential phase shifts and the attenuation between the vertical polarization channel and the horizontal polarization channel; and
    an equalization circuit mounted on a circuit board with the processing unit and electrically connected to the dual-polarized MIMO antenna array, the equalization circuit is configured to:
        receive the pre-equalization parameter from the processing unit;
        apply the pre-equalization parameter to an input signal received from a communication source within the UAV before the input signal is transmitted through the dual-polarized MIMO antenna array; and
        adjust a phase and an amplitude of each of the vertical polarization channel and the horizontal polarization channel to counteract the rain-induced crosstalk.

2. The system of claim 1, wherein the dual-polarized MIMO antenna array utilizes a +45° and a −45° linear polarization.

3. The system of claim 1, wherein the processing unit is further configured to calculate the pre-equalization parameter based on an elevation angle between the UAV and the ground-based receiver.

4. The system of claim 1, wherein the pre-equalization parameter includes a phase correction, and an amplitude correction calculated to reduce a Cross Polarization Discrimination (XPD) resulting from a rain-induced effect.

5. The system of claim 1, wherein the processing unit is configured to calculate the measured phase shift and the attenuation for a rainfall rate ranging from 50 millimeter per hour (mm/h) to 200 mm/h.

6. The system of claim 1, further comprising a temperature sensor and a humidity sensor mounted on the UAV and electrically connected to the processing unit, wherein the processing unit is configured to distinguish between a rain-induced signal degradation and a degradation caused by another atmospheric condition.

7. The system of claim 1, wherein the equalization circuit is configured to maintain a signal integrity for a Fifth Generation (5G) wireless communication frequency and a Sixth Generation (6G) wireless communication frequency band during a rainfall event exceeding 100 mm/h.

8. The system of claim 1, wherein the equalization circuit is configured to compensate for a signal variation when the UAV is at height ranging from 100 meters to 2000 meters above a ground level.

9. The system of claim 1, wherein the equalization circuit is configured to maintain a measurement-to-adjustment latency of less than 200 milliseconds.

10. The system of claim 1, wherein the rain sensor comprises a configurable sampling mechanism electrically connected to the processing unit that adjusts a measurement frequency based on a detected rate of change in the rainfall intensity.

11. The system of claim 1, wherein the processing unit is configured to calculate the pre-equalization parameter for an operating frequency between 5 gigahertz (GHz) and 100 GHz.

12. The system of claim 1, wherein the equalization circuit is further configured to:
    update the pre-equalization parameter in real-time for a continuous transmission mode; or
    update the pre-equalization parameter immediately before each packet transmission for a packet-based transmission mode.

13. The system of claim 1, wherein generating the pre-equalization parameter comprises:
   decomposing the vertical polarization channel and the horizontal polarization channel into a vertical plane and a horizontal plane;
   calculating a rain-induced effect separately for a component in each of the vertical plane and the horizontal plane; and
   determining a compensatory phase adjustment and a compensatory amplitude adjustment for each component.

14. The system of claim 1, wherein the pre-equalization parameter is specifically calculated to counteract a phase shift disparity between a vertical polarization component and a horizontal polarization component exceeding 30 degrees per kilometer.

15. The system of claim 1, wherein the processing unit is further configured to establish an emergency communication channel during a severe weather event to facilitate a rescue operation.

16. The system of claim 1, wherein the processing unit is further configured to establish a communication link with the ground-based receiver located in a tropical region characterized by a rainfall.

17. A method for mitigating rain-induced crosstalk in wireless communication from an unmanned aerial vehicle (UAV), the method comprising:
   measuring a rainfall intensity in real-time using a rain sensor mounted on the UAV;
   monitoring a UAV height above a ground level using an altitude sensor mounted on the UAV;
   calculating a measured phase shift and an attenuation for a vertical polarization component and a horizontal polarization component based on the measured rainfall intensity, the UAV height, and an elevation angle using a processing unit mounted on the UAV and electrically connected to the rain sensor and the altitude sensor;
   generating a pre-equalization parameter with the processing unit to compensate for a differential effect between a vertical polarization channel and a horizontal polarization channel;
   applying the pre-equalization parameter with an equalization circuit mounted on the UAV and to an input signal received from a communication source within the UAV before the input signal is transmitted through a dual-polarized Multiple-Input Multiple-Output (MIMO) antenna array mounted on the UAV; and
   dynamically adjusting the pre-equalization parameter in response to a change in the rainfall intensity.

* * * * *